United States Patent [19]
Hayashi et al.

[11] Patent Number: 6,069,884
[45] Date of Patent: May 30, 2000

[54] METHOD OF COMMUNICATION BETWEEN A BASE STATION AND A PLURALITY OF MOBILE UNIT COMMUNICATION APPARATUS, A BASE STATION, AND MOBILE UNIT COMMUNICATION APPARATUS

[75] Inventors: Masaki Hayashi, Yokohama; Kazuyuki Miya, Kawasaki, both of Japan

[73] Assignee: Matsushita Electric Industrial Co., Ltd., Osaka, Japan

[21] Appl. No.: 08/937,005

[22] Filed: Sep. 24, 1997

[30] Foreign Application Priority Data

Oct. 1, 1996 [JP] Japan ................................ 8-260625

[51] Int. Cl.[7] .................... H04B 7/10; H04B 7/216; H04L 12/42
[52] U.S. Cl. .................. 370/335; 370/455; 370/515; 375/347; 455/562
[58] Field of Search ..................... 370/335, 342, 370/515, 337, 347, 441, 479, 455; 375/200, 206, 207, 208, 209, 210, 347; 455/561, 562, 101

[56] References Cited

U.S. PATENT DOCUMENTS 5,544,167 8/1996 Lucas et al. .

FOREIGN PATENT DOCUMENTS 0755127 1/1997 European Pat. Off. .

OTHER PUBLICATIONS

Performance of Coherent Rake Detection using Interpolation on DS/CDMA, By A. Higashi et al.; Technical Report of IEICE (1994–10); pp., 57–62.

*Primary Examiner*—Alpus H. Hsu
*Assistant Examiner*—Afsar M. Qureshi
*Attorney, Agent, or Firm*—Lowe Hauptman Gopstein Gilman & Berner

[57] ABSTRACT

A method of communication between a base station with at least a mobile unit communication apparatus, a base station and a mobile unit communication apparatus employing the method are disclosed. The base station has a plurality of antennas for the antenna diversity. Transmission data is spectrum-spread with a pn code for a target mobile unit communication apparatus and a pilot signal is also spectrum-spread with a pn code every antenna, which are frequency-multiplexed. A mobile unit de-spectrum-spreads the pilot signal with one of pn codes selected, which corresponds the transmitting antenna. The pilot signal and data may be time-division-multiplexed in a time slot. Data of the used antenna is transmitted by the base station by a position of null data in the time slot, or differentially coded which is detected by a null data detection circuit or by the delayed detection. Data of the antenna used may be transmitted by a mobile unit communication apparatus. The antenna transmitting the data may be detected at the mobile unit communication apparatus by detecting an error from error check codes. In the downward time slot, the spectrum-spread pilot signal is frequency-multiplexed with spectrum-spread data and in the upward time slot, the spectrum-spread pilot signal is time-division-multiplexed with the spectrum-spread data.

21 Claims, 28 Drawing Sheets

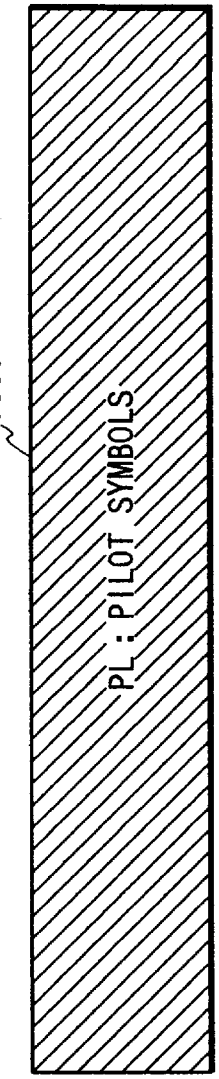
FIG. 12A  PCH: PILOT SIG
FIG. 12B  TCH-A: DATA TRANSMITTED FROM ANTENNA 902
FIG. 12C  TCH-B: DATA TRANSMITTED FROM ANTENNA 903

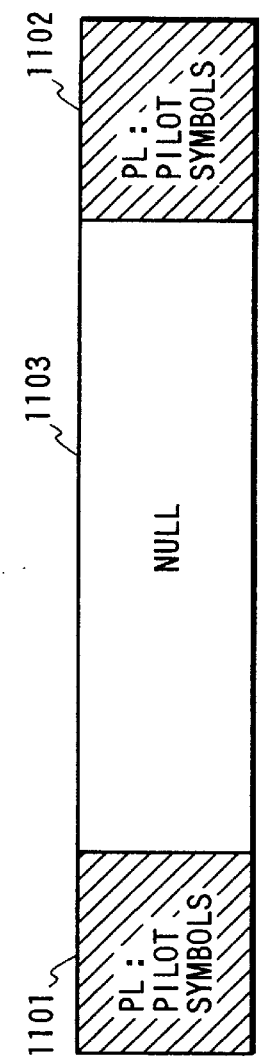
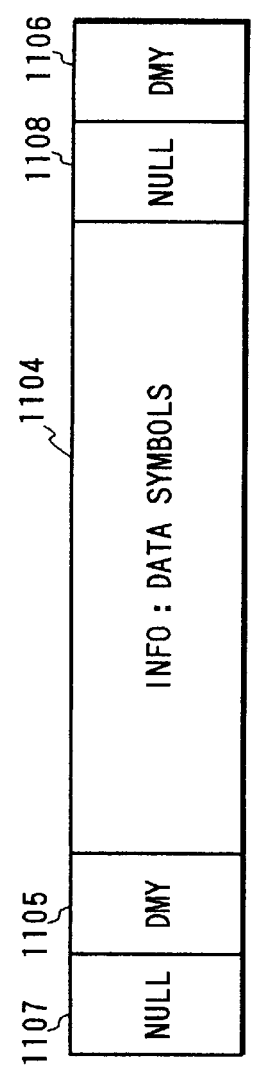
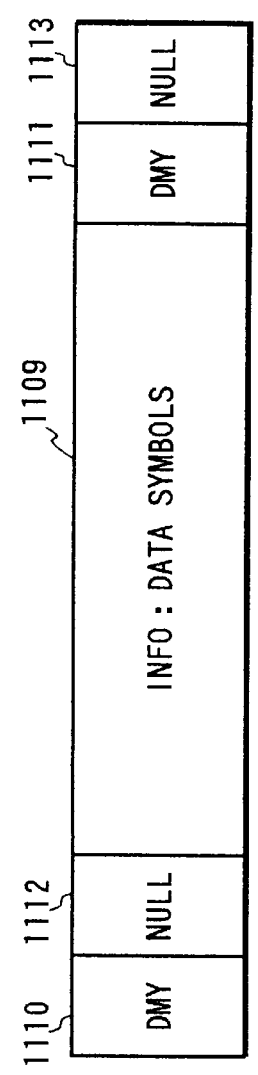
FIG. 15A  PCH : PILOT SIG
FIG. 15B  TCH-A : DATA TRANSMITTED FROM ANTENNA 0902
FIG. 15C  TCH-B : DATA TRANSMITTED FROM ANTENNA 0903

FIG. 24

| NO. | SYNDROME | PCH | PROBABILITY |
|---|---|---|---|
| 1 | S1 | 1 | 10 |
|   |    | 2 | 4 |
| 2 | S2 | 1 | 2 |
|   |    | 2 | 50 |
| 3 | S3 | 1 | 50 |
|   |    | 2 | 12 |
| 4 | S4 | 1 | 100 |
|   |    | 2 | 20 |
| ⋮ | ⋮ | ⋮ | ⋮ |
| N | SN | 1 | 8 |
|   |    | 2 | 30 |

METHOD OF COMMUNICATION BETWEEN A BASE STATION AND A PLURALITY OF MOBILE UNIT COMMUNICATION APPARATUS, A BASE STATION, AND MOBILE UNIT COMMUNICATION APPARATUS

BACKGROUND OF THE INVENTION

1. Field of the Invention

This invention relates to a method of communication between a base station and a plurality of mobile unit communication apparatus, a base station, and a mobile unit communication apparatus.

2. Description of the Prior Art

A method of communication between a base station and a plurality of mobile unit communication apparatus through the CDMA (Code Division Multiple Access) and the TDD (Time Division Duplex) and a base station and a mobile unit communication apparatus employing this method are known. Generally, in the TDD method, it is easy to provide the transmission diversity to a base station. In the spatial-diversity-transmission, a base station having a plurality of antennas transmits data to a mobile unit communication apparatus with one of the antennas showing a better transmission condition to reduce the phasing in the mobile unit communication apparatus.

A method of reducing the affection by the phasing in the direct spectrum spreading CDMA method is disclosed by Akihiro Higashi, Tsutomu Taguchi, and Koji Ohno, "Performance of Coherent RAKE Detection using Interpolation on DS/CDMA on TECHNICAL REPORT OF IEICE A.P94-74, RCS94-98 (1994-10), at pages 57–62 published by THE INSTITUTE OF ELECTRONICS, INFORMATION AND COMMUNICATION ENGINEERS.

SUMMARY OF THE INVENTION

The aim of the present invention is to provide an improved method of communication between a base station and at least a mobile unit communication apparatus, an improved base station, and an improved mobile unit communication apparatus.

According to the present invention, a first method of communication between a base station and at least a mobile unit communication apparatus through the code division multiple accessing is provided, which comprises the steps of: in the base station, (a) providing a plurality of antennas to the base station for the antenna diversity communication; (b) spectrum-spreading data to be transmitted to the mobile unit communication apparatus with a first pn (pseudonoise) code assigned to the mobile unit communication apparatus; (c) spectrum-spreading a pilot signal with second pn codes respectively assigned to a plurality of the antennas to generate spectrum-spread pilot signals, the first pn code being different from each of the second pn codes; (d) multiplexing one of the spectrum-spread pilot signals corresponding to one of a plurality of the antennas to be used with the spectrum-spread data; and (e) transmitting the multiplexed spectrum-spread pilot signal and spectrum-spread data as a radio wave signal through one of a plurality of the antennas every downward time slot; in the mobile unit communication apparatus, (f) receiving the radio wave signal; (g) supplying one of third pn codes corresponding to the second pn codes; (h) de-spectrum-spreading the received radio wave signals with one of third pn codes to output a pilot signal correlation result; (i) de-spectrum-spreading the received radio wave signals with a fourth pn code corresponding to the first pn code to provide data correlation results; (j) RAKE-combining the data correlation results in accordance with the pilot signal correlation result to output a RAKE-combined signal; (k) synchronously-detecting the RAKE-combined signal to output a combined signal; and (l) controlling supplying one of the third pn codes in accordance with the combined signal.

In the first method, the pilot signal may be spectrum-spread with the first pn codes only for a predetermined symbol period in the downward time slot. In this case, the data is spectrum-spread for a predetermined interval other than the predetermined symbol period in the downward time slot.

The first method may further comprise the steps of:
in the mobile unit communication apparatus, determining which one of a plurality of the antennas is used in accordance with the received radio wave signals; generating a command indicative of which one of a plurality of the antennas is used; and transmitting the command to the base station; in the base station, receiving the transmitted command, wherein one of third pn codes corresponding to the second pn codes being supplied in accordance with the transmitted command.

The first method may further comprise the steps of: in the base station, determining one of a plurality of the antennas to be used; providing a null data interval in a data interval of the spectrum-spread data in the time slot at one of predetermined positions in the downward time slot in accordance with the determined one of a plurality of the antennas; and in the mobile unit communication apparatus, detecting the null data interval and detecting one of predetermined positions from the radio wave signal, one of third pn codes corresponding to the second pn codes being supplied in accordance with the detected one of predetermined positions.

The first method may further comprise the steps of: in the base station, determining one of a plurality of the antennas to be used; differentially-coding information indicative of one of plurality of the antennas to be used; providing the differentially-coded information in the downward time slot together with the spectrum-spread data; in the mobile unit communication apparatus, detecting the differentially-coded information from the received radio wave signal through the delayed-detection; and one of third pn codes corresponding to the second pn codes being supplied in accordance with the detected differentially-coded information.

The first method may further comprise the steps of: (m) in the base station, error-check-coding the data to include error check codes before spectrum-spreading the data; in the mobile unit communication apparatus, (n) error-correcting the data with the error check codes after synchronously-detecting the RAKE-combined signal; (o) judging whether the data is error-corrected to a predetermined extent; (p) outputting the error-corrected data if the data is error-corrected to the predetermined extent; (q) supplying another of the third pn codes and effecting steps (h) to (k) and (n) to (p) until the data is error-corrected to the predetermined extent.

According to the present invention, a second method of communication between a base station and at least a mobile unit communication apparatus through the code division multiple accessing is provided, which comprises the steps of: in the base station, (a) providing a plurality of antennas to the base station for the antenna diversity communication; (b) error-correction-coding data to include error correction codes; (c) spectrum-spreading data from step (b) with a first pn code assigned to the mobile unit communication apparatus; (d) spectrum-spreading a pilot signal with second pn codes respectively assigned to a plurality of the antennas to generate spectrum-spread pilot signals, the first pn code being different from each of the second pn codes; (e) multiplexing one of the spectrum-spread pilot signals corresponding to one of a plurality of the antennas to be used with the spectrum-spread data; and (f) transmitting the multiplexed spectrum-spread pilot signal and spectrum-spread data as a radio wave signal through one of a plurality of the antennas to be used every downward time slot; in the mobile unit communication apparatus, (g) receiving the radio wave signal; (h) de-spectrum-spreading the received radio wave signal with third pn codes corresponding to the second pn codes to output pilot signal correlation results in parallel; (i) de-spectrum-spreading the received radio wave signals with a fourth pn code corresponding to the first pn code to provide data correlation results; (j) RAKE-combining the data correlation results in accordance with the pilot signal correlation results to output RAKE-combined signals in parallel; (k) synchronously-detecting the RAKE-combined signals to output detection signals in parallel; (l) error-correcting the data from the detection signals with the error check codes, outputting error-corrected signals, and generating syndromes in the detection signals; (m) predicting one of plurality of antennas used from the syndromes; and (n) outputting one of the error-corrected signals in accordance with the predicted one of plurality of antennas.

According to the present invention, a third method of communication between a base station and at least a mobile unit communication apparatus through the code division multiple accessing and the time-division-duplexing is provided, which comprises the steps of: in the base station, (a) providing a plurality of antennas to the base station for the antenna diversity communication; (b) spectrum-spreading data to be transmitted to the mobile unit communication apparatus with a first pn code assigned to the mobile unit communication apparatus every downward time slot; (c) spectrum-spreading a pilot signal with second pn codes respectively assigned to a plurality of the antennas to generate spectrum-spread pilot signals every downward time slot, the first pn codes being different from each of the second pn codes; (d) multiplexing one of the spectrum-spread pilot signals corresponding to one of a plurality of the antennas to be used with the spectrum-spread data; and (e) transmitting the multiplexed spectrum-spread pilot signal and spectrum-spread data as a radio wave signal through one of a plurality of the antennas every downward time slot; in the mobile unit communication apparatus, (f) receiving the radio wave signal to output the data in accordance with the pilot signal included in the radio wave signal; (f) spectrum-spreading second data to be transmitted to the base station with a third pn code corresponding to the first pn code; (g) spectrum-spreading a second pilot signal with the third pn code; (h) time-division-multiplexing the spectrum-spread second pilot signal with the spectrum-spread second data in every upward time slot; and (i) transmitting the time-division-multiplexed spectrum-spread second pilot signal and the spectrum-spread second data as a second radio wave signal.

According to the present invention, a first base station for communicating with at least a mobile unit communication apparatus through the code division multiple access is provided, which comprises: a first spectrum-spreading circuit for spectrum-spreading data to be transmitted to the mobile unit communication apparatus with a first pn code assigned to the mobile unit communication apparatus; a selection circuit; and a plurality of transmission units respectively having a plurality of antennas provided for the antenna diversity communication, the selection circuit selecting one of a plurality of the antennas in accordance with control data, each of a plurality of the transmission units further including: a second spectrum-spreading circuit for spectrum-spreading a pilot signal with a second pn code assigned to the selected one of a plurality of the antennas to generate a spectrum-spread pilot signal, the first pn code being different from the second pn code, the selection circuit supplying the spectrum-spread data to one of the plurality transmission units in response to the control data; a multiplexing circuit for multiplexing the spectrum-spread pilot signal with the spectrum-spread data, and a transmitting circuit for transmitting the multiplexed spectrum-spread pilot signal and the spectrum-spread data as a radio wave signal through the selected one of antennas every downward time slot.

According to the present invention, a first mobile unit communication apparatus for communicating with a base station having a plurality of antennas through the code division multiple accessing is provided, the base station transmitting a radio wave signal by one of a plurality of the antennas, the radio wave signal including data multiplexed with a pilot signal, the data being spectrum-spread with a first pn code assigned to the mobile unit communication apparatus, the pilot signal being spectrum-spread with a second pn code assigned to one of a plurality of the antennas transmitting the radio wave signal, the mobile unit communication apparatus comprising: a receiving circuit for receiving the radio wave signal; a switch circuit for supplying one of third pn codes corresponding to the second pn code; a first de-spectrum-spreading circuit for de-spectrum-spreading the received radio wave signal with one of the third pn codes from the switch circuit to output a pilot signal correlation result; a second de-spectrum-spreading circuit for de-spectrum-spreading the received radio wave signal with a fourth pn code corresponding to the second pn code to provide data correlation results; a RAKE-combining circuit for RAKE-combining the data correlation results in accordance with the pilot signal correlation result to output a RAKE-combined signal; a synchronously-detecting circuit for synchronously-detecting the RAKE-combined signal; and a controlling circuit for controlling the switch circuit to supply one of the third pn codes in accordance with an output of the synchronously-detecting circuit.

According to the present invention, a second base station for communicating with at least a mobile unit communication apparatus through the code division multiple access is provided, which comprises: a first spectrum-spreading circuit for spectrum-spreading data to be transmitted to the mobile unit communication apparatus with a first pn code assigned to the mobile unit communication apparatus; a selection circuit; and a plurality of transmission units respectively having a plurality of antennas provided for the antenna diversity communication, the selection circuit selecting one of the antennas in accordance with control data, each of a plurality of the transmission units further including: first and second switching circuits; a second spectrum-spreading circuit for spectrum-spreading a pilot signal with a second pn code assigned to the selected one of a plurality of the antennas to generate a spectrum-spread pilot signal, the first pn code being different from the second pn code, the selection circuit supplying the spectrum-spread data to one of a plurality of the transmission units in response to the control data; a multiplexing circuit for multiplexing the spectrum-spread pilot signal with the spectrum-spread data, the first switching circuit supplying the spectrum-spread pilot signal to the multiplexing circuit for a predetermined symbol period in a downward time slot, the second switching circuit supplying the spectrum-spread data to the multiplexing circuit for a period other than the predetermined interval in the downward time slot; and a transmitting circuit for transmitting the multiplexed spectrum-spread pilot signal and the spectrum-spread data as a radio wave signal through the antenna every the downward time slot.

According to the present invention, a second mobile unit communication apparatus for communicating with a base station having a plurality of antennas through the code division multiple accessing is provided, the base station transmitting a radio wave signal by one of a plurality of the antennas, the radio wave signal including data multiplexed with a pilot signal, the data being spectrum-spread with a first pn code assigned to the mobile unit communication apparatus for a predetermined interval in a downward time slot, the pilot signal being spectrum-spread with a second pn code assigned to one of a plurality of the antennas transmitting the radio wave signal for a period other than the predetermined interval in the downward time slot, the mobile unit communication apparatus comprising: a receiving circuit for receiving the radio wave signal; a switch circuit for supplying one of third pn codes corresponding to the second pn code; a first de-spectrum-spreading circuit for de-spectrum-spreading the received radio wave signal with one of the third pn codes from the switch circuit to output a pilot signal correlation result; a second de-spectrum-spreading circuit for de-spectrum-spreading the received radio wave signal with a fourth pn code corresponding to the first pn code to provide data correlation results; a storing circuit for storing the data correlation results; a RAKE-combining circuit for RAKE-combining the data correlation results from the storing circuit in accordance with the pilot signal correlation result to output a RAKE-combined signal; a synchronously-detecting circuit for synchronously-detecting the RAKE-combined signal; and a controlling circuit for controlling the switch circuit to supply one of the third pn codes in accordance with an output of the synchronously-detecting circuit.

According to the present invention, a third base station for communicating with at least a mobile unit communication apparatus through the code division multiple access is provided, which comprises: a first spectrum-spreading circuit for spectrum-spreading data to be transmitted to the mobile unit communication apparatus with a first pn code assigned to the mobile unit communication apparatus; a selection circuit; and a plurality of transmission units respectively having a plurality of antennas provided for the antenna diversity communication, the selection circuit selecting one of the antennas in accordance with control data, each of a plurality of the transmission units further including: a second spectrum-spreading circuit for spectrum-spreading a pilot signal with a second pn code assigned to the selected antenna to generate a spectrum-spread pilot signal, the first pn code being different from the second pn code, the selecting circuit supplying the spectrum-spread data to one of a plurality of the transmission units in accordance with the control data; a multiplexing circuit for multiplexing the spectrum-spread pilot signal with the spectrum-spread data, and a transmitting circuit for transmitting the multiplexed spectrum-spread pilot signal and the spectrum-spread data as a radio wave signal through the selected antenna; a differentially-coding circuit for differentially-coding the control data; and a time division multiplex circuit for time-division-multiplexing the differentially-coded control data with the data in a downward time slot, the first spectrum-spreading circuit spectrum-spreading the differentially-coded control data and the data.

According to the present invention, a third mobile unit communication apparatus for communicating with a base station having a plurality of antennas through the code division multiple accessing is provided, the base station transmitting radio wave signal by one of a plurality of the antennas, the radio wave signal including differentially-coded control data indicative of one of a plurality of the antennas used and data multiplexed with a pilot signal, the data being spectrum-spread with a first pn code assigned to the mobile unit communication apparatus, the pilot signal being spectrum-spread with a second pn code assigned to one of a plurality of the antennas transmitting the radio wave signal, the mobile unit communication apparatus comprising: a receiving circuit for receiving the radio wave signal; a switch circuit for supplying one of third pn codes corresponding to the second pn code; a first de-spectrum-spreading circuit for de-spectrum-spreading the received radio wave signal with one of the third pn codes from the switch circuit to output a pilot signal correlation result; a second de-spectrum-spreading circuit for de-spectrum-spreading the received radio wave signal with a fourth pn code corresponding to the first pn code to provide data correlation results; a RAKE-combining circuit for RAKE-combining the data correlation results in accordance with the pilot signal correlation result to output a RAKE-combined signal; a synchronously-detecting circuit for synchronously-detecting the RAKE-combined signal; and a delayed-detection circuit for detecting the control data from the RAKE-combined signal through the delayed-detection; and a controlling circuit for controlling the switch circuit to supply one of the third pn codes in accordance with an output of the delayed-detection circuit.

According to the present invention, a fourth base station for communicating with at least a mobile unit communication apparatus through the code division multiple access is provided, which comprises: an error-check-coding circuit for error-check-coding data to be transmitted to the mobile unit communication apparatus; a first spectrum-spreading circuit for spectrum-spreading data from the error-check-coding circuit with a first pn code assigned to the mobile unit communication apparatus; a selection circuit; and a plurality of transmission units respectively having a plurality of antennas provided for the antenna diversity communication, the selection circuit selecting one of a plurality of the antennas in accordance with control data, each of a plurality of the transmission units further including: a second spectrum-spreading circuit for spectrum-spreading a pilot signal with a second pn code assigned to the selected antenna to generate a spectrum-spread pilot signal, the first pn code being different from the second pn code, the selecting circuit supplying the spectrum-spread data to one of a plurality of the transmission units to select one of the antennas; a multiplexing circuit for multiplexing the spectrum-spread pilot signal with the spectrum-spread data; and a transmitting circuit for transmitting the multiplexed spectrum-spread pilot signal and the spectrum-spread data as a radio wave signal through the selected antenna.

According to the present invention, a fourth mobile unit communication apparatus for communicating with a base station having a plurality of antennas through the code division multiple accessing is provided, the base station transmitting a radio wave signal by one of a plurality of the antennas, the radio wave signal including data multiplexed with a pilot signal, the data error-check-coded to have error check codes, the data being spectrum-spread with a first pn code assigned to the mobile unit communication apparatus, the pilot signal being spectrum-spread with a second pn code assigned to one of a plurality of the antennas transmitting the radio wave signal, the mobile unit communication apparatus comprising: a receiving circuit for receiving the radio wave signal; a switch circuit for supplying one of third pn codes corresponding to the second pn code; a first de-spectrum-spreading circuit for de-spectrum-spreading the received radio wave signal with one of the third pn codes from the switch circuit to output a pilot signal correlation result; a second de-spectrum-spreading circuit for de-spectrum-spreading the received radio wave signal with a fourth pn code corresponding to the first pn code to provide data correlation results; a RAKE-combining circuit for RAKE-combining the data correlation results in accordance with the pilot signal correlation result to output a RAKE-combined signal; a synchronously-detecting circuit for synchronously-detecting the RAKE-combined signal; an error-correcting circuit for error correcting an output of the synchronously-detecting circuit; and a controlling circuit for Judging whether the data from an output of the synchronously-detecting circuit is error-corrected to a predetermined extent, for outputting the error-corrected data if the data from the output of the synchronously-detecting circuit is error-corrected to the predetermined extent, for controlling the switching circuit to supply another of the third pn codes, and for operating the RAKE-combining circuit, the synchronously-detecting circuit, and the error-correcting circuit until the output of the synchronously-detecting circuit is error-corrected to the predetermined extent.

According to the present invention, a fifth base station for communicating with at least a mobile unit communication apparatus through the code division multiple access is provided, which comprises: an error-correction-coding circuit for error-correction-coding data to be transmitted to the mobile unit communication apparatus; a first spectrum-spreading circuit for spectrum-spreading data error-correction-coding circuit with a first pn code assigned to the mobile unit communication apparatus; a selection circuit; and a plurality of transmission units respectively having a plurality of antennas provided for the antenna diversity communication, the selection circuit selecting one of a plurality of the antennas in accordance with control data, each of a plurality of the transmission units further including: a second spectrum-spreading circuit for spectrum-spreading a pilot signal with a second pn code assigned to the selected antenna to generate a spectrum-spread pilot signal, the first pn code being different from the second pn code, the selecting circuit supplying the spectrum-spread data to one of a plurality of the transmission units to select one of the antennas; a multiplexing circuit for multiplexing the spectrum-spread pilot signal with the spectrum-spread data, and a transmitting circuit for transmitting the multiplexed spectrum-spread pilot signal and the spectrum-spread data as a radio wave signal through the antenna.

According to the present invention, a fifth mobile unit communication apparatus for communicating with a base station having N antennas through the code division multiple accessing is provided, the base station transmitting radio wave signal by one of the N antennas, N being a natural number, the radio wave signal including data multiplexed with a pilot signal, the data being error-correction-coded to have error check codes, the data being spectrum-spread with a first pn code assigned to the mobile unit communication apparatus, the pilot signal being spectrum-spread with one of N second pn codes assigned to the antenna transmitting the radio wave signal, the mobile unit communication apparatus comprising: a receiving circuit for receiving the radio wave signal; N first de-spectrum-spreading circuit for de-spectrum-spreading the received radio wave signal with N third pn codes respectively corresponding to the N second pn codes to output N pilot signal correlation results; a second de-spectrum-spreading circuit for de-spectrum-spreading the received radio wave signal with a fourth pn code corresponding to the first pn code to provide data correlation results; N RAKE-combining circuits for respectively RAKE-combining the data correlation results in accordance with the N pilot signal correlation results to output N RAKE-combined signals; N synchronously-detecting circuits for respectively synchronously-detecting the N RAKE-combined signals to output N detection signals; N error-correcting circuits for error-correcting N detection signals to output N error-corrected signals and generating corresponding N syndromes; and a control circuit for predicting which one of the N antennas is used from the N syndromes, and for outputting one of the N error-corrected signals corresponding to the N syndromes showing a highest probability.

According to the present invention, a sixth base station for communicating with at least a mobile unit communication apparatus through the code division multiple access and the time-division-duplexing is provided, which comprises: a first spectrum-spreading circuit for spectrum-spreading data to be transmitted to the mobile unit communication apparatus with a first pn code assigned to the mobile unit communication apparatus; a selection circuit; and a plurality of transmission units respectively having a plurality of antennas provided for the antenna diversity communication, the selection circuit selecting one of a plurality of the antennas in accordance with control data, each of a plurality of the transmission units further including: a second spectrum-spreading circuit for spectrum-spreading a pilot signal with a second pn code assigned to the selected antenna to generate a spectrum-spread pilot signal, the first pn code being different from the second pn code, the selection circuit supplying the spectrum-spread data to one of the plurality transmission units in response to the control data to select one of the antennas; a multiplexing circuit for multiplexing the spectrum-spread pilot signal with the spectrum-spread data; and a transmitting circuit for transmitting the multiplexed spectrum-spread pilot signal and the spectrum-spread data as a radio wave signal through the antenna every downward time slot; and a receiving circuit for receiving a second radio wave signal from the mobile unit communication apparatus every upward time slot.

According to the present invention, a sixth mobile unit communication apparatus for communicating with a base station having a plurality of antennas through the code division multiple accessing and the time-division-duplexing, the base station transmitting first radio wave signal by one of a plurality of antennas, the first radio wave signal including first data multiplexed with a first pilot signal, the first radio wave signal the data being spectrum-spread with a first pn code assigned to the mobile unit communication apparatus, the first pilot signal being spectrum-spread with a second pn code assigned to one of a plurality of the antennas transmitting the first radio wave signal, the mobile unit communication apparatus comprising: a receiving circuit for receiving the first radio wave signal; a switch circuit for supplying one of third pn codes corresponding to the second pn codes; a first de-spectrum-spreading circuit for de-spectrum-spreading the received first radio wave signal with one of the third pn codes from the switch circuit to output a pilot signal correlation result; a second de-spectrum-spreading circuit for de-spectrum-spreading the received radio wave signal with a fourth pn code corresponding to the first pn code to provide data correlation results; a RAKE-combining circuit for RAKE-combining the data correlation results in accordance with the pilot signal correlation result to output a RAKE-combined signal; a synchronously-detecting circuit for synchronously-detecting the RAKE-combined signal; a controlling circuit for controlling the switch circuit to supply one of the third pn codes in accordance with an output of the synchronously-detecting circuit; a third spectrum-spreading circuit for spectrum-spreading second data to be transmitted to the base station with the fourth pn code; a fourth spectrum-spreading circuit for spectrum-spreading a second pilot signal with the third pn code; a time-division-duplexing circuit for time-division-duplexing the spectrum-spread pilot signal from the fourth spectrum-spreading circuit with the spectrum-spread second data; and a transmitting circuit for transmitting an output of the time-division-duplexing circuit as a second radio wave signal every downward time slot to the base station.

BRIEF DESCRIPTION OF THE DRAWINGS

The object and features of the present invention will become more readily apparent from the following detailed description taken in conjunction with the accompanying drawings in which:

FIGS. 12A to 12C are illustrations of a fourth embodiment showing time slot formats transmitted from a base station;

FIGS. 15A to 15C are another time slot formats of the fourth embodiment;

FIG. 24 is a table of the seventh embodiment;

The same or corresponding elements or parts are designated with like references throughout the drawings.

DETAILED DESCRIPTION OF THE INVENTION

FIRST EMBODIMENT

Figure 1:
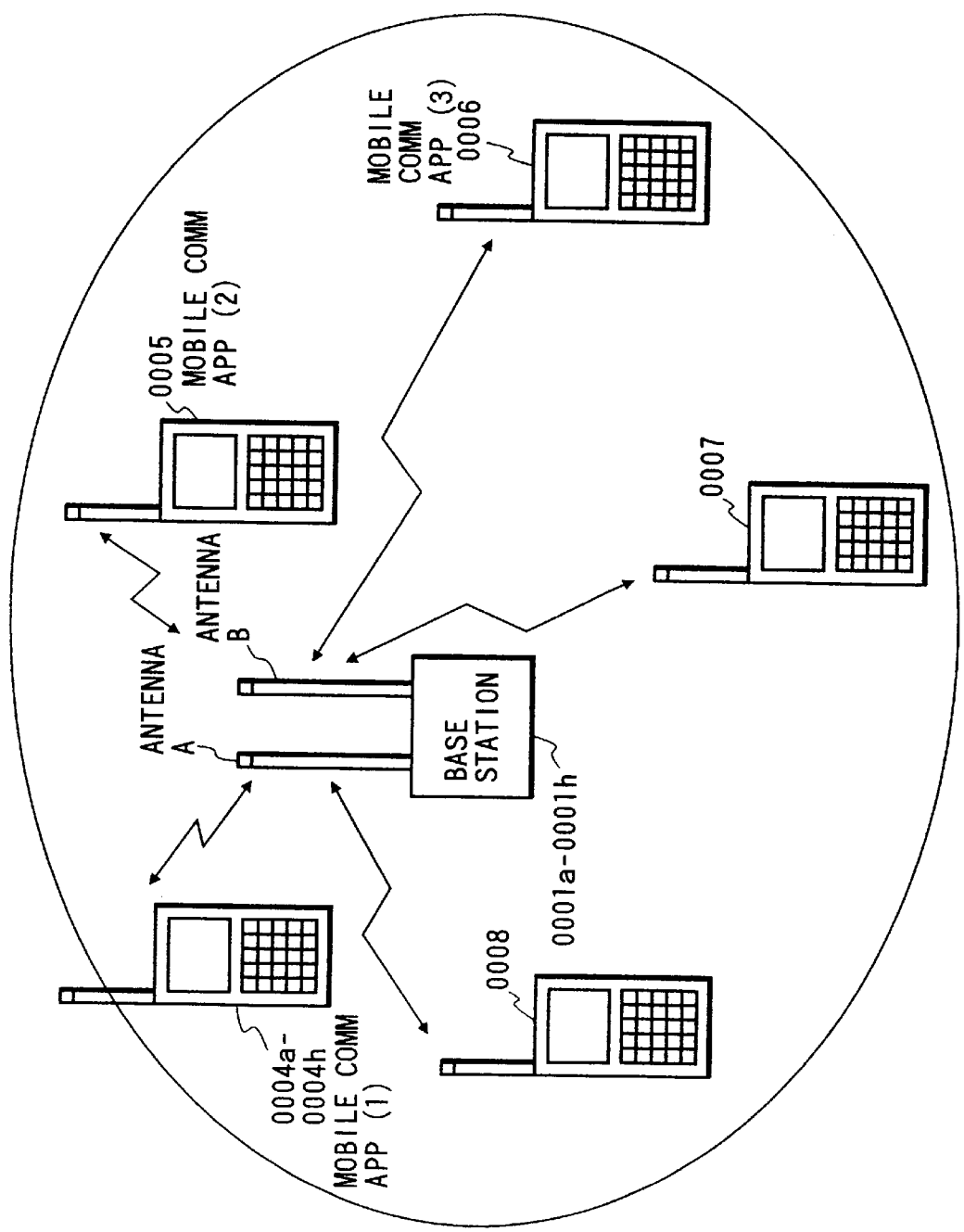
FIG. 1 is a block diagram of a communication system of all embodiments of this invention.
Figure 2:
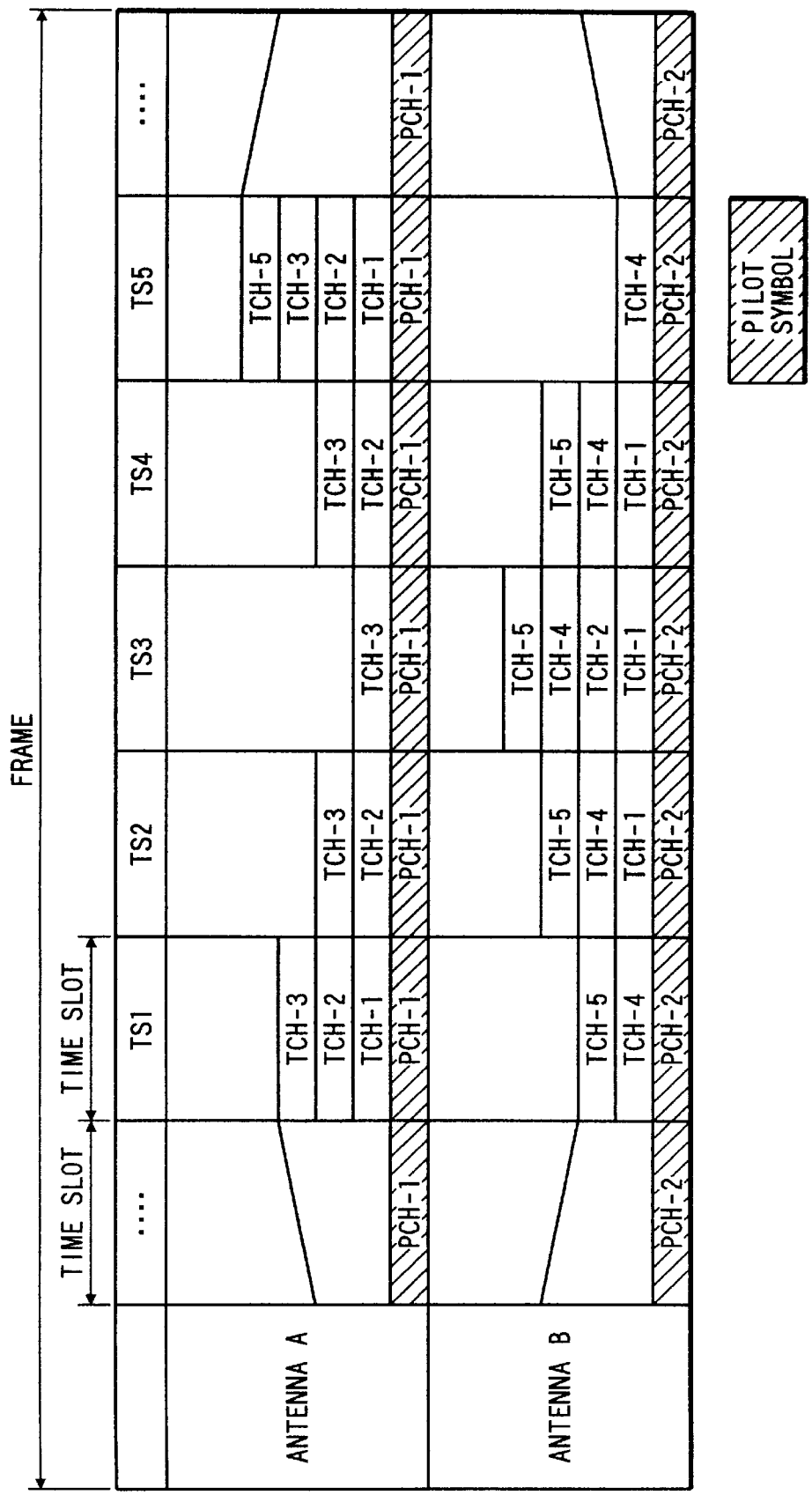
FIG. 2 is a time chart of a transmission condition variation of a first embodiment.

FIG. 1 is a block diagram of a communication system of all embodiments of this invention. FIG. 2 is a time chart of a transmission condition variation of the first embodiment.

In this embodiment, it is assumed that a base station 0001*a* having two antennas A and B can communicate with five mobile unit communication apparatus 0004*a* and 0005 to 0008 at the same time.

A communication method of the first embodiment will be described.

As shown in FIG. 2, a frame includes a plurality of time slots and each time slot includes a plurality of symbols. Each time slot of the antenna A includes a pilot channel PCH-1 for transmitting a pilot signal (symbols) identically defined for the antenna A. On the other hand, each time slot of the antenna B includes a pilot channel PCH-2 for transmitting another pilot signal (symbols) identically defined for the antenna B.

The base station 0001*a* predicts a line condition from the received signal from the mobile unit communication apparatus 0004*a* and selects one of the antennas A or B showing a better line condition between the base station 0001*a* and the mobile unit communication apparatus 0004*a*. Similarly, the base station 0001*a* selects one of the antennas A and B every mobile unit communication apparatus 0005 to 0008. The base station 0001*a* determines the selection of the antennas A and B for every mobile unit communication apparatus 0004*a* and 0005 to 0008 every time slot or every several time slots.

In a time slot tsl, the pilot signal PCH-1, data TCH-1, data TCH-2, and data TCH-3 are transmitted from the antenna A through multiplexing and the pilot signal PCH-2, data TCH-4, and data TCH-5 are transmitted from the antenna B with multiplexing. In a time slot ts2, the pilot signal PCH-1, data TCH-2, and data TCH-3 are transmitted from the antenna A with multiplexing and the pilot signal PCH-2, data TCH-1, and data TCH-4, and data TCH-5 are transmitted from the antenna B through multiplexing.

Because different radio wave signals transmitted from the same antenna reach the mobile unit communication apparatus 0004a via the same path, they are subjected to the same line condition such as the phasing. Thus, it is possible to predict a reference phase and a delayed profile of any data transmitted from the antenna A from the received pilot signal PCH-1. Similarly, it is also possible to predict a reference phase and a delayed profile of any data transmitted from the antenna B from the received pilot signal PCH-2. In this system, any of the mobile unit communication apparatus 0004a and 0005 to 0008 can receive the pilot signal for every symbol period in every time slot.

Figure 3:
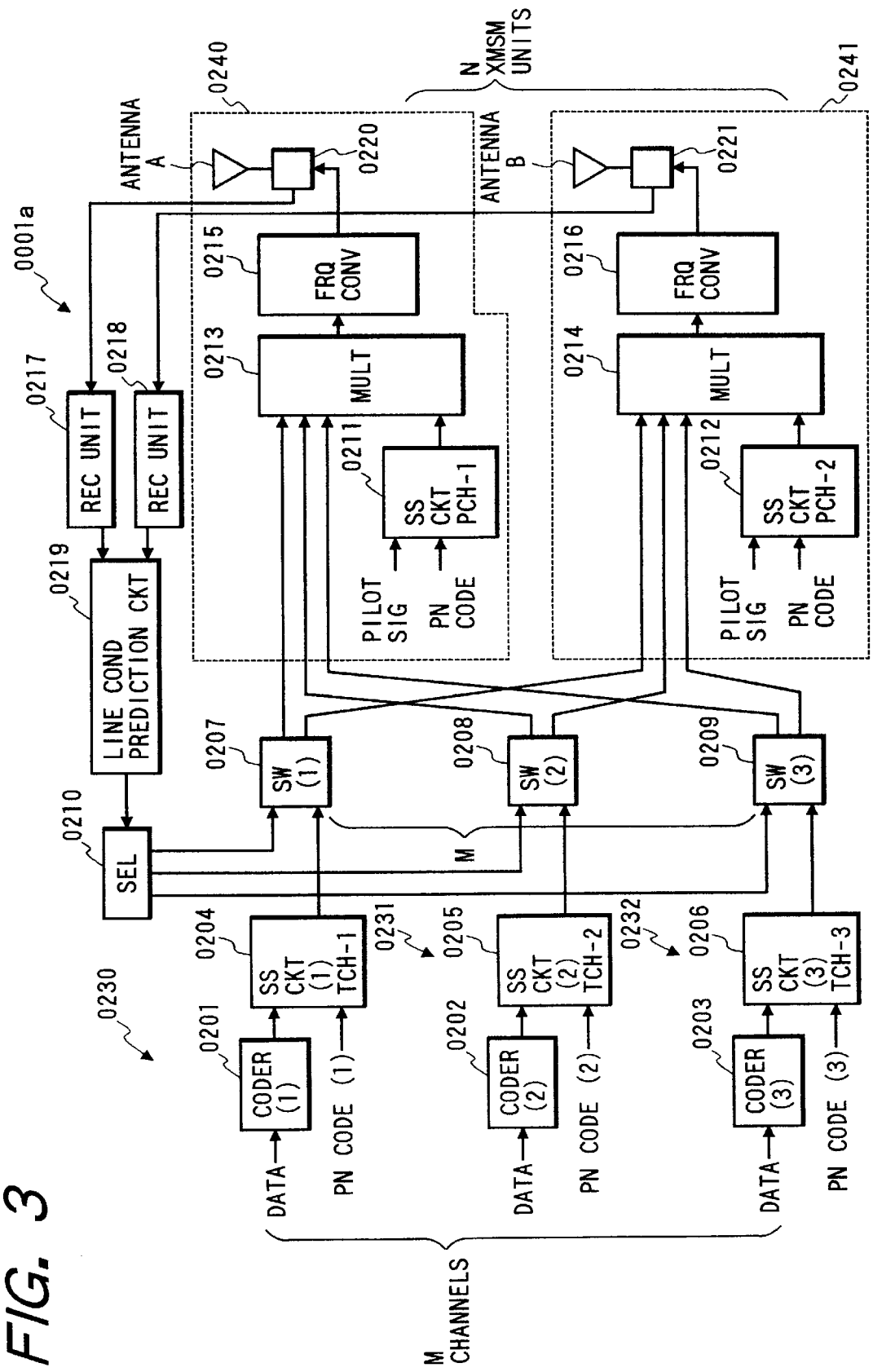
FIG. 3 is a block diagram of a base station of the first embodiment.
Figure 4:
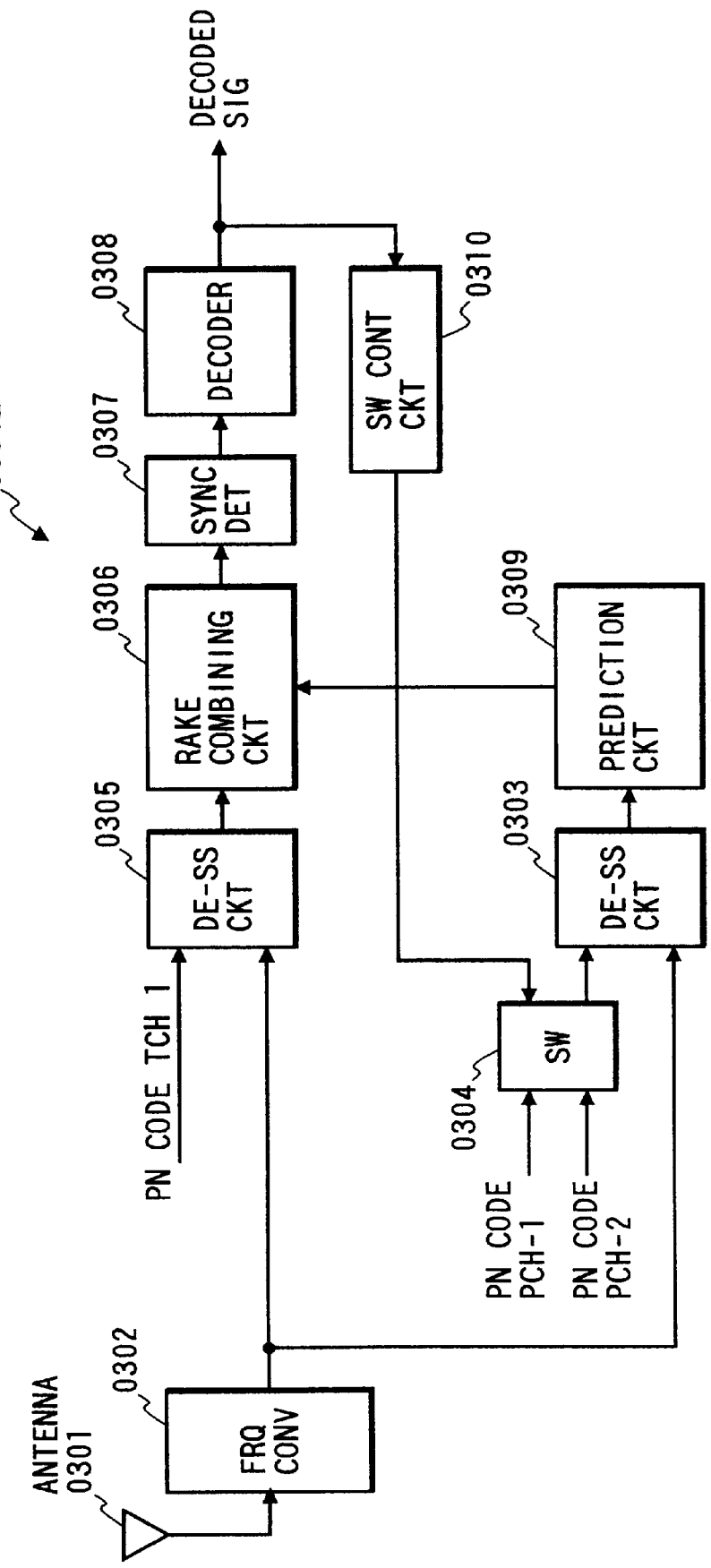
FIG. 4 is a block diagram of a mobile unit communication apparatus of the first embodiment.

FIG. 3 is a block diagram of a base station 0001a of the first embodiment, wherein only three channels are shown. FIG. 4 is a block diagram of a mobile unit communication apparatus 0004a of the first embodiment.

The base station 0001a of the first embodiment comprises M channels of input circuits 0230 to 0232 for receiving data, M switches 0207 to 0209, N transmission units 0240 and 0241 for transmitting radio wave signals, receiving units 0217 and 0218, a line condition prediction circuit 0219, and a selector 0210, wherein M and N are natural numbers.

The input circuit 0230 of the channel 1 includes a decoder 0201 for decoding data of a channel CH1, a spectrum-spreading circuit 0204 for spectrum-spreading an output of the coder 0201 with a pseudonoise (pn) code (1). The channel CH1 is assigned to the mobile unit 0004a. The selector 0210 selects one of N transmission units, that is one of antennas A and B, by controlling the switches 0207 to 0209. The transmission unit 0240 comprises a spectrum-spreading circuit 0211 for spectrum-spreading a pilot signal assigned to the antenna A, a multiplexer 0213 for multiplexing outputs of the switches 0207 to 0209 and the spectrum-spread pilot signal from the spectrum-spreading circuit 0211, a frequency converter 0215 for frequency-converting an output of the multiplexer 0213, a duplexer 0220, and the antenna A.

The input circuits 0231 and 0232 have the same structure as the input circuit 0230 and the transmission unit 0241 has the same structure as the transmission unit 0240 except that the pn code supplied to the spectrum-spreading circuit 0212 is different from the pn code supplied to the spectrum-spreading circuit 0211, that is the pn code supplied to the spectrum-spreading circuit 0212 is assigned to the antenna B.

A spectrum-spreading circuit 0211 spectrum-spreads a pilot signal with the pn code identically defined for the antenna A. The multiplexer 0213 multiplexes outputs of the switch 0207 to 0209 and the spectrum spread pilot signal from the spectrum-spreading circuit 0211. A frequency converter 0215 frequency-converts the output of the multiplexer 0213 and transmits the frequency-converted signal through the antenna A via the duplexer 0220.

Moreover, the spectrum-spreading circuit 0212 spectrum-spreads the pilot signal with the pn code identically defined for the antenna B. A multiplexer 0214 multiplexes outputs of the switches 0207 to 0209 and the spectrum-spread pilot signal from the spectrum-spreading circuit 0212. A frequency converter 0216 frequency-converts the output of the multiplexer 0214 and transmits the frequency-converted signal through the antenna B via the duplexer 0221.

The antenna A receives radio wave signals from the mobile unit communication apparatus 0004a and 0005 to 0008 and the duplexer 0220 supplies the received radio wave signals to the receiving unit 0217. The receiving unit 0217 supplies received data to the line condition prediction circuit 0219. Similarly, the antenna B receives radio wave signals from the mobile unit communication apparatus 0004a and 0005 to 0008 and the duplexer 0221 supplies the received radio wave signals to the receiving unit 0218. The receiving unit 0218 supplies received data to the line condition prediction circuit 0219.

The line condition prediction circuit 0219 predicts the line conditions between the antenna A and the mobile unit communication apparatus 0004a and 0005 to 0008 and between the antenna B and the mobile unit communication apparatus 0004a and 0005 to 0008 and selects one of the antennas A or B every line or channel. The switch 0207 selects one of the antennas A and B in response to the selection circuit 0210. The selection is made every time slot or every several time slots. Similarly, each of the switches 0208 and 0209 selects one of the antennas A and B in response to the selection circuit 0210. The selection is made every time slot or every several time slots also.

Because one of the antennas A and B showing a better line condition with respect to the channel is selected, an intensity of the desired radio wave signal is increased. On the other hand, this does not increase interference components to other mobile unit communication apparatus.

Because the pilot signals are continuously transmitted every antenna every downward time slot, the reference phase and the delayed profile can be predicted more surely.

FIG. 4 is a block diagram of a mobile unit communication apparatus 0004a shown in FIG. 1.

The mobile unit communication apparatus 0004a comprises an antenna 0301 for receiving a radio wave signal transmitted from the base station 0001a, a frequency converter 0302 for frequency-converts the received radio wave signal into a base band signal, a de-spectrum-spreading circuit 0305 for de-spectrum-spreading the base band signal from the frequency converter 0302 with a pn code assigned to the mobile unit communication apparatus, a switch 0304 for outputting either of the pn code for the pilot signal assigned to the antenna A or the pn code for the pilot signal assigned to the antenna B, a de-spectrum-spreading circuit 0303 for de-spectrum-spreading the base band signal from the frequency converter 0302 with the pn code from the switch 0304, a prediction circuit 0309 for predicting a line condition in accordance with a correlation result from the de-spectrum spreading circuit 0303, and a RAKE combining circuit 0306 for RAKE-combining correlation results of the data in accordance with the predicted line condition, a synchronous detection circuit 0307 for effecting the synchronous detection to an output of the RAKE combining circuit 0306, and a decoder 0308 for decoding an output of the synchronous detection circuit 0307 and outputting a decoded signal, and a switch control circuit 0310 for generating a switching control signal supplied to the switch 0304 in accordance with the decoded signal.

An operation of the mobile unit communication apparatus 0004a will be described.

The antenna 0301 receives the radio wave signal generated and transmitted from the base station 0001a as mentioned above. The frequency converter 0302 frequency-converts the received radio wave signal into the base band signal. The de-spectrum-spreading circuit 0305 de-spectrum-spreads the base band signal from the frequency converter 0302 with the pn code assigned to the mobile unit communication apparatus 0004a. The switch 0304 outputs either of the pn code for the pilot signal assigned to the antenna A or the pn code for the pilot signal assigned to the antenna B. The de-spectrum-spreading circuit 0303 de-spectrum-spreads the base band signal from the frequency converter 0302 with the pn code from the switch 0304. The RAKE combining circuit 0306 predicts the line condition in accordance with the correlation result of the pilot signal from the de-spectrum-spreading circuit 0303 and RAKE-combines correlation results of the data from the de-spectrum-spreading circuit 0305 in accordance with the predicted line condition. The switch control circuit 0310 generates the switching control signal supplied to the switch 0304 in accordance with the predicted line condition.

The synchronous detection circuit 0307 effects the synchronous detection to the output of the RAKE combining circuit 0306. The decoder 0308 decodes the output of the synchronous detection circuit 0307 and outputs the decoded signal. The switch control circuit 0310 selects one of the pn codes corresponding to the antenna A and the antenna B in accordance with the line condition, that is, the decoded signal. In other words, when the base station 0001a transmits the data to this mobile unit communication apparatus 0004a through the antenna A, this mobile unit communication apparatus 0004a supplies the pn code corresponding to the pn code assigned to the antenna A to the de-spreading circuit 0303.

SECOND EMBODIMENT

A communication method of a second embodiment will be described.

Figure 5A:
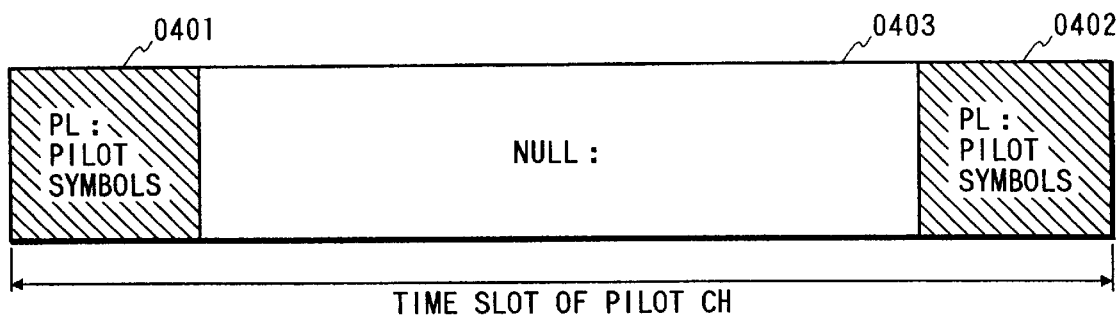
FIG. 5A is an illustration of a format of a time slot of the pilot channel of a second embodiment.
Figure 5B:
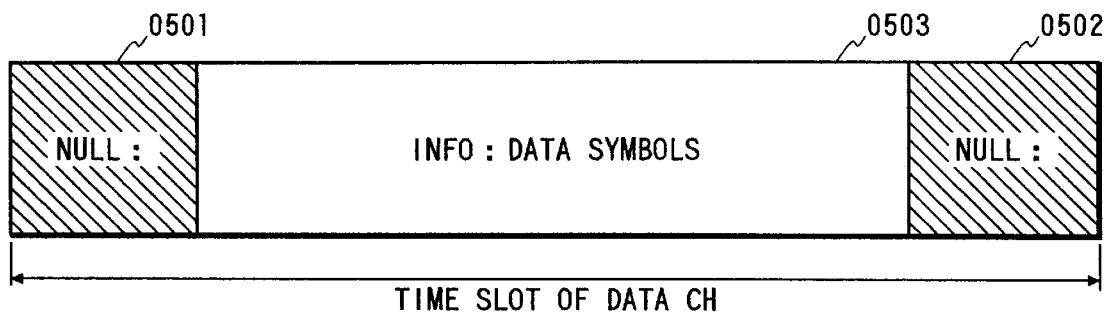
FIG. 5B is an illustration of a format of a time slot of the data channel of the second embodiment.

FIG. 5A is an illustration of a format of a time slot of the pilot channel of the second embodiment. FIG. 5B is an illustration of a format of a time slot of the data channel of the second embodiment.

In this method, the pilot symbols are transmitted for only several symbol periods 0401 from the start of the time slot of the pilot channel and several symbol periods 0402 just before the end of the time slot of the pilot channel as shown in FIG. 5A. For the intermediate period 0403, null data is transmitted in the pilot channel. On the other hand, in the data channel, the data symbols are transmitted for only the intermediate symbol period 0503 corresponding to the intermediate period 0403 and null data is transmitted for several symbol periods 0501 from the start of the time slot of the data channel and several symbol periods 0502 between the intermediate symbol period 0503 and the end of the time slot of the data channel. Therefore, the pilot symbols and the data symbols do not overlapped with each other, so that interference components to the pilot signal can be reduced and it is possible to increase a transmission power of the pilot signal to be readily received by the mobile unit communication apparatus 0004b and 0005 to 0008. Increase in the transmission power of the pilot signal makes the prediction of the reference phase and the delayed profile surer. From each of the antennas A and B the pilot signals spectrum-spread by respective pn codes are transmitted. Therefore, the number of the multiplexed pilot signals corresponds to that of the antennas A and B provided to the base station 0001b.

Figure 5C:
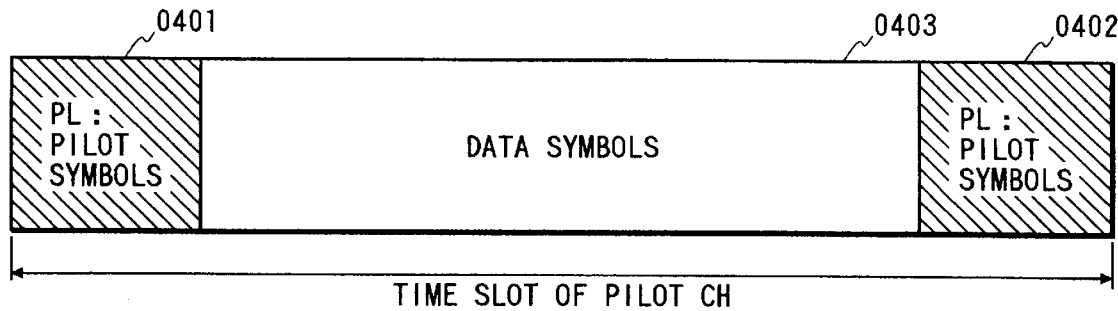
FIG. 5C is an illustration of a modified format of a time slot of the pilot channel of the second embodiment.

FIG. 5C is an illustration of a modified format of a time slot of the pilot channel of the second embodiment. In this case, data symbols are transmitted for the intermediate symbol period 0403 in the pilot channel. The data transmitted for the intermediate symbol periods 0403 in the pilot channel is used for the error correction or communication controlling.

Figure 6:
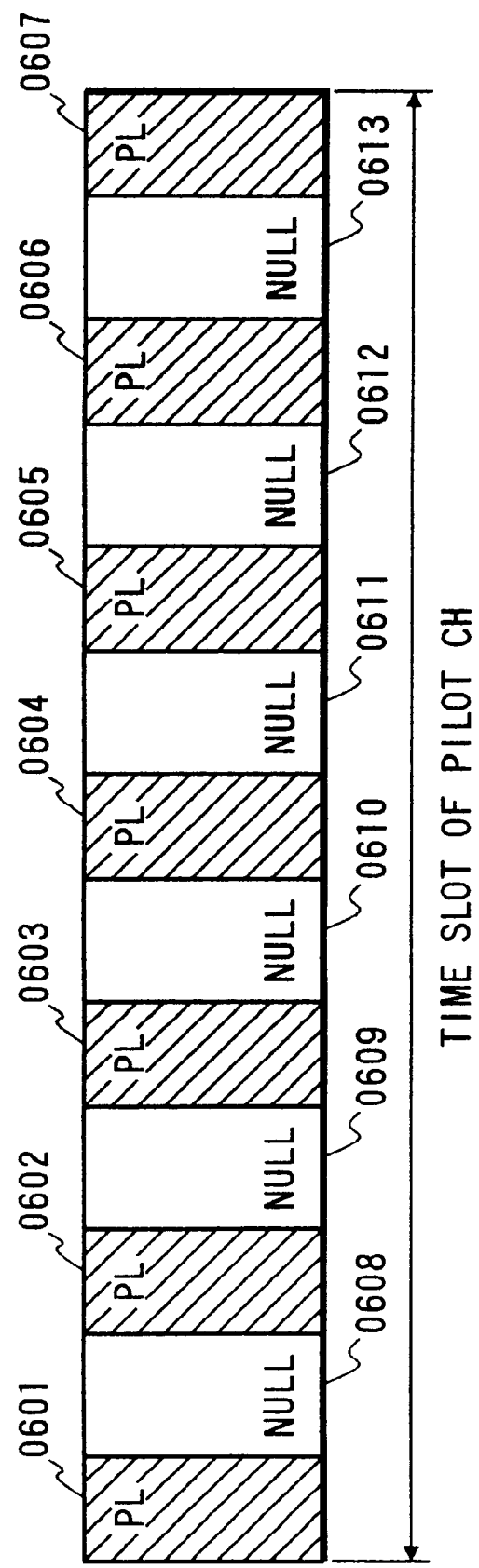
FIG. 6 is an illustration of the second embodiment showing another modified format of a time slot of the pilot channel.

FIG. 6 is an illustration of the second embodiment showing another modified format of a time slot of the pilot channel. In this format, the pilot signal is intermittently transmitted every several symbol periods. That is, the pilot signal is transmitted for periods 0601, 0602, 0603, 0604, 0605, 0606, and 0607 in the pilot channel and null data is transmitted for periods 0608, 0609, 0610, 0611, 0612, and 0613.

In the communication method of the second embodiment, the pilot signal and data are transmitted at predetermined periods in time slots in the pilot channel and the data channel respectively.

Figure 7:
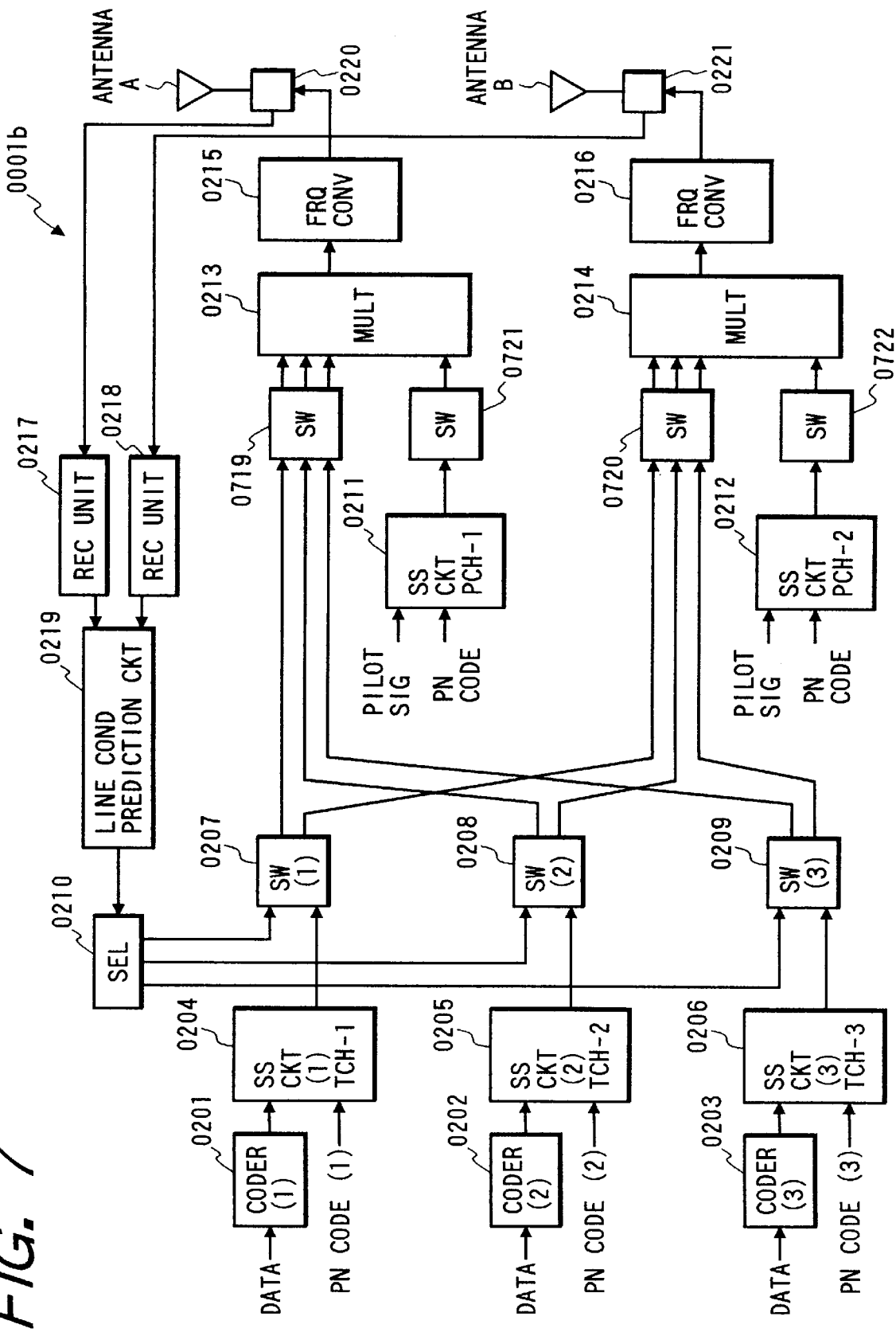
FIG. 7 is a block diagram of a base station of the second embodiment.

FIG. 7 is a block diagram of a base station 0001b of the second embodiment.

The base station 0001b of the second embodiment has substantially the same structure as that of the first embodiment. The difference is that switching circuits 0719 to 0722 are further provided.

The data to be transmitted from the antenna A from the switches 0207 to 0209 are supplied to the multiplexer 0213 through a switching circuit 0719 for the intermediate period 0503 in the time slot of the data channel and null data is supplied to the multiplexer 0213 for the several symbol periods 0501 from the start of the time slot of the data channel and for the several symbol periods 0502 just before the end of the time slot as shown in FIG. 5B. On the other hand, the pilot signal spectrum-spread with the pn code assigned to the antenna B is supplied to the multiplexer 0213 through a switching circuit 0712 only for the several symbol periods 0401 from the start of the time slot of the data channel and only for the several symbol periods 0402 just before the end of the time slot as shown in FIG. 5A. For the intermediate period 0403, the pilot signal is not supplied to the multiplexer 0213.

Similarly, the data to be transmitted from the antenna B from the switches 0207 to 0209 are supplied to the multiplexer 0214 through a switching circuit 0720 for the intermediate period 0503 in the time slot of the data channel and null data is supplied to the multiplexer 0214 for the several symbol periods 0501 from the start of the time slot of the data channel and for the several symbol periods 0502 just before the end of the time slot as shown in FIG. 5B. On the other hand, the pilot signal spectrum-spread with the pn code assigned to the antenna B is supplied to the multiplexer 0214 through the switching circuit 0722 only for the several symbol periods 0401 from the start of the time slot of the pilot channel and only for the several symbol periods 0402 just before the end of the time slot as shown in FIG. 5A. For the intermediate period 0403, the pilot signal is not supplied to the multiplexer 0214.

The switch circuits 0719 to 0722 may also transmit data and the pilot signal as shown in the format in FIG. 6.

Figure 8:
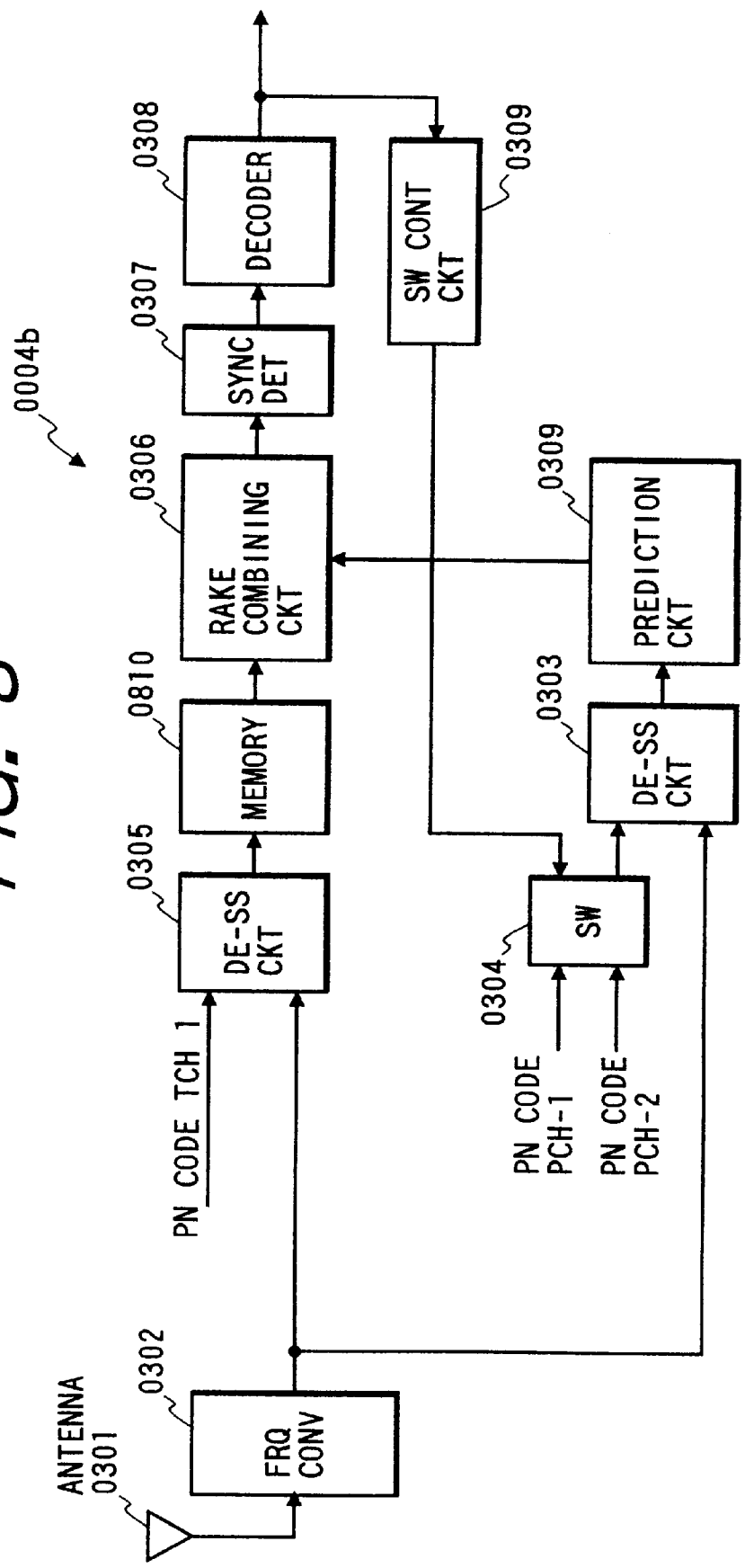
FIG. 8 is a block diagram of a mobile unit communication apparatus of the second embodiment.

FIG. 8 is a block diagram of a mobile unit communication apparatus 0004b of the second embodiment.

The mobile unit communication apparatus 0004b of the second embodiment has substantially the same structure as that of the first embodiment. The difference is that a memory 0801 is further provided.

The memory 0801 stores the correlation result detected by the de-spectrum-spreading circuit 0305 and supplies the stored correlation results to the RAKE combining circuit 0806.

THIRD EMBODIMENT

Figure 9:
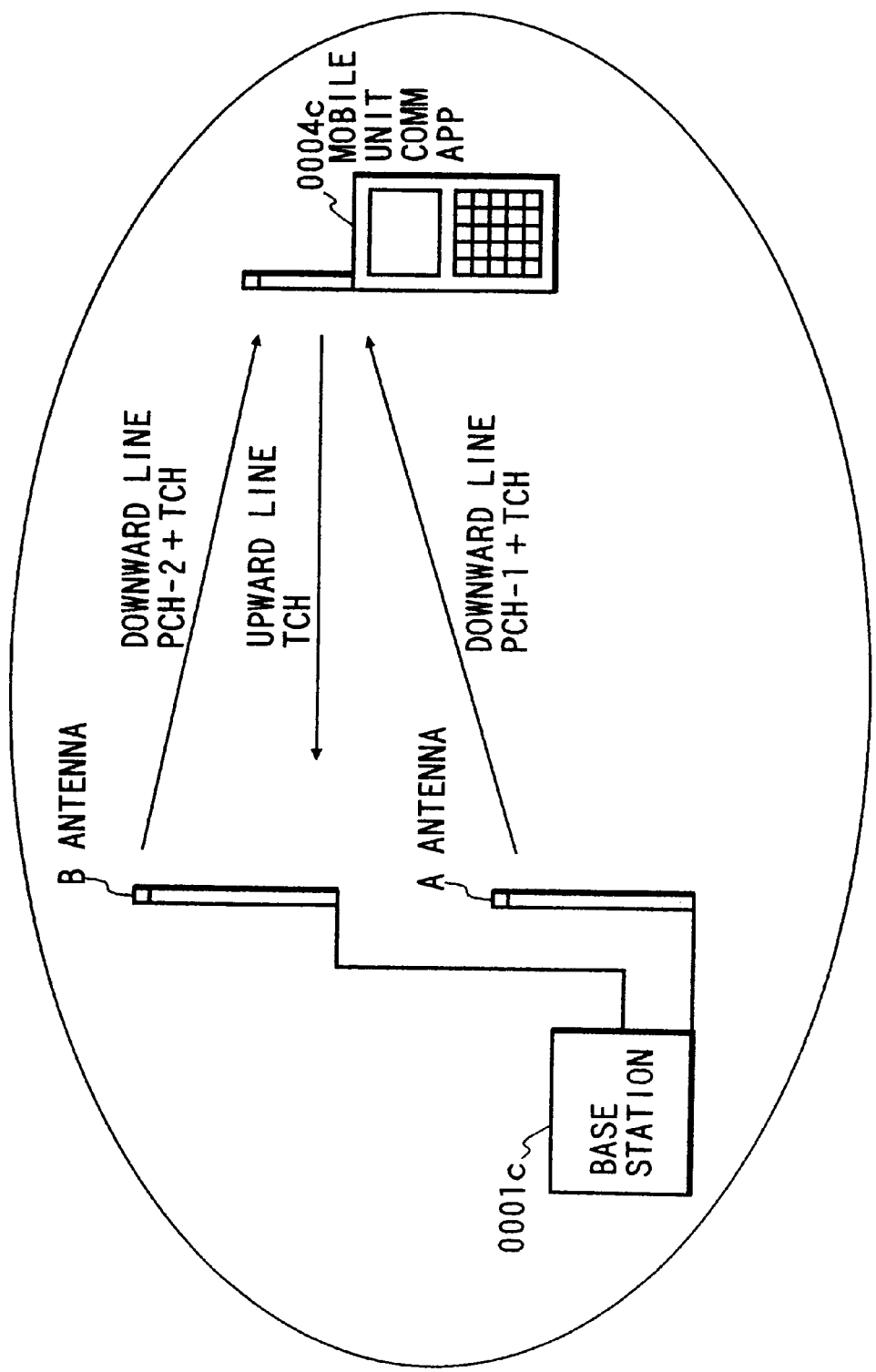
FIG. 9 is an illustration of a third embodiment showing a communication system.

FIG. 9 is an illustration of a third embodiment showing a communication system. A base station 0001c having antennas A and B communicates with a mobile unit communication apparatus 0004c. The antennas A and B are used for upward and downward communications.

The base station 0001c transmits the pilot signal PCH-1 from the antenna A and transmits the pilot signal PCH-2 from the antenna B. These pilot signals are spectrum-spread by respective pn codes assigned to respective antennas A and B. The data from the base station 0001c to respective mobile unit communication apparatus are transmitted through one of the antennas A and B showing a better line condition with data spectrum-spread with the pn code assigned to the mobile unit communication apparatus 0004c, wherein the spectrum-spread pilot signals are transmitted from both antennas A and B at first. Alternately, the pilot signals are transmitted by both antennas A and B alternately.

On the other hand, the mobile unit communication apparatus 0004a receives both spectrum-spread pilot signals transmitted from the antenna A and the antenna B through the downward lines successively, detects which one of the lines (antenna A or B) is in better line condition, and generates a command indicating the antenna to be used and transmits the command to the base station 0001c through the upward line. Then, the base station 0001c transmits the data to the mobile unit communication apparatus 0004c through the antenna indicated by the command, showing a better line condition from the next slot or next frame. Therefore, the switching between the antennas A and B can be provided in response to a suddenly change in the line condition. Then, the mobile unit communication apparatus 0004c can always receive the pilot signal PCH-1 or PCH-2 in a better line condition.

As mentioned, the mobile unit communication apparatus 0004c determines which one of the antennas A and B to be used and transmits the command indicating which one of the antennas A and B is to be used to the base station 0001c through the upward line. Because the command is transmitted through the upward line, a transmission efficiency is not decreased by this. In general transmission and receiving diversity systems, the transmission diversity shows a less diversity effect than the receiving diversity, so that the capacity of subscribers is limited by the downward lines. Therefore, it is desired that the command or control data is transmitted through the upward line rather than the downward line. That is, in this embodiment, the command indicative of which one of the antennas A and B is to be used is transmitted through the upward line, so that an amount of data in the downward line does not increase. Therefore, a transmission quality of the downward line does not decrease.

Figure 10:
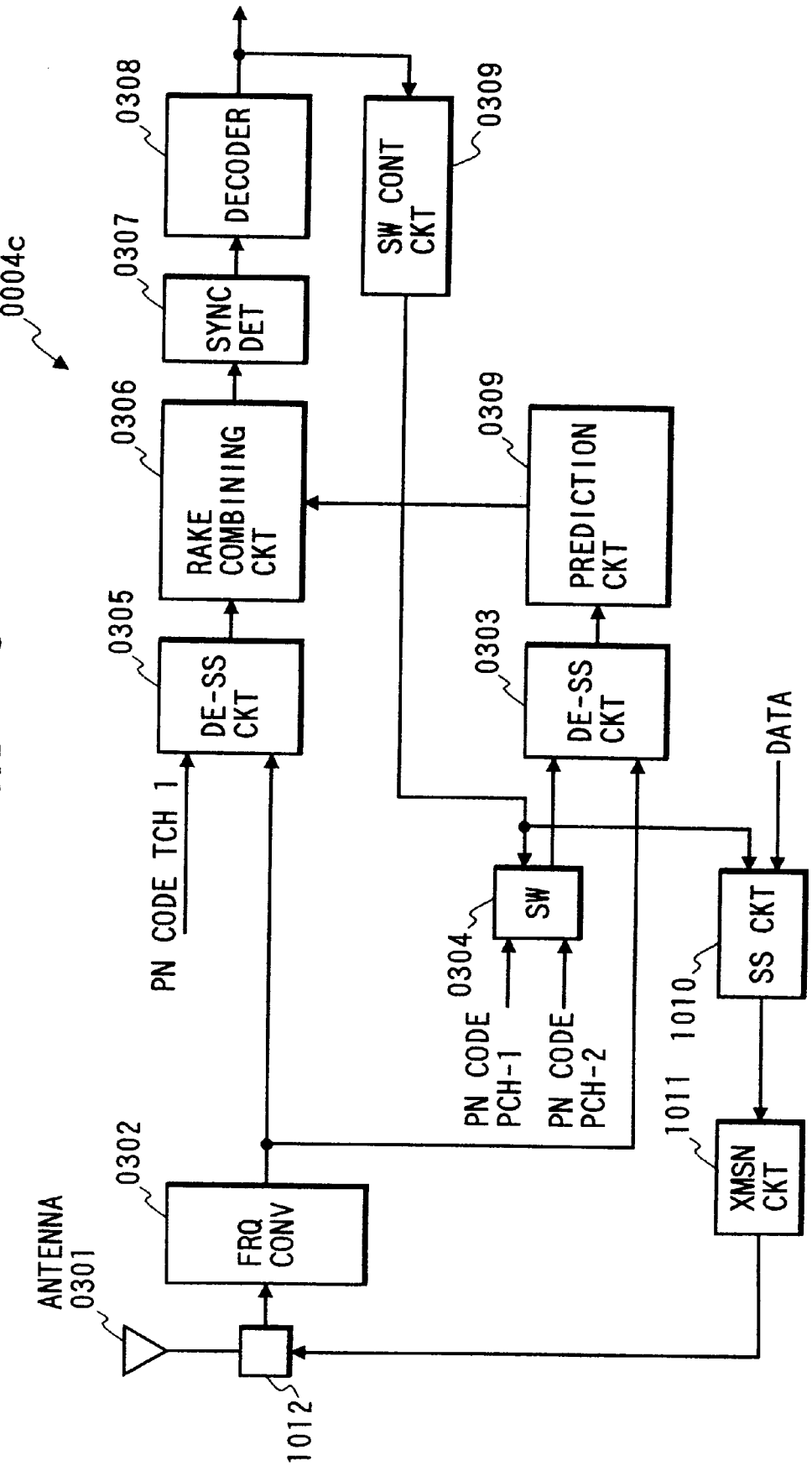
FIG. 10 is a block diagram of the mobile unit communication apparatus of the third embodiment.

FIG. 10 is a block diagram of the mobile unit communication apparatus 0004c of the third embodiment.

The mobile unit communication apparatus 0004c of the third embodiment has substantially the same structure as that of the first embodiment. The difference is that a spectrum-spreading circuit 1010 for spectrum-spreading the data to be transmitted to the base station and adding, to the transmission data, the switching control signal indicating which one of the antennas A and B is to be used. A transmission circuit 1011 and a duplexer 1012 are inherent to the mobile unit communication apparatus.

The mobile unit communication apparatus 0004c of the third embodiment transmits the switching control signal indicating which one of the antennas is to be used to the base station 0001c.

Figure 11:
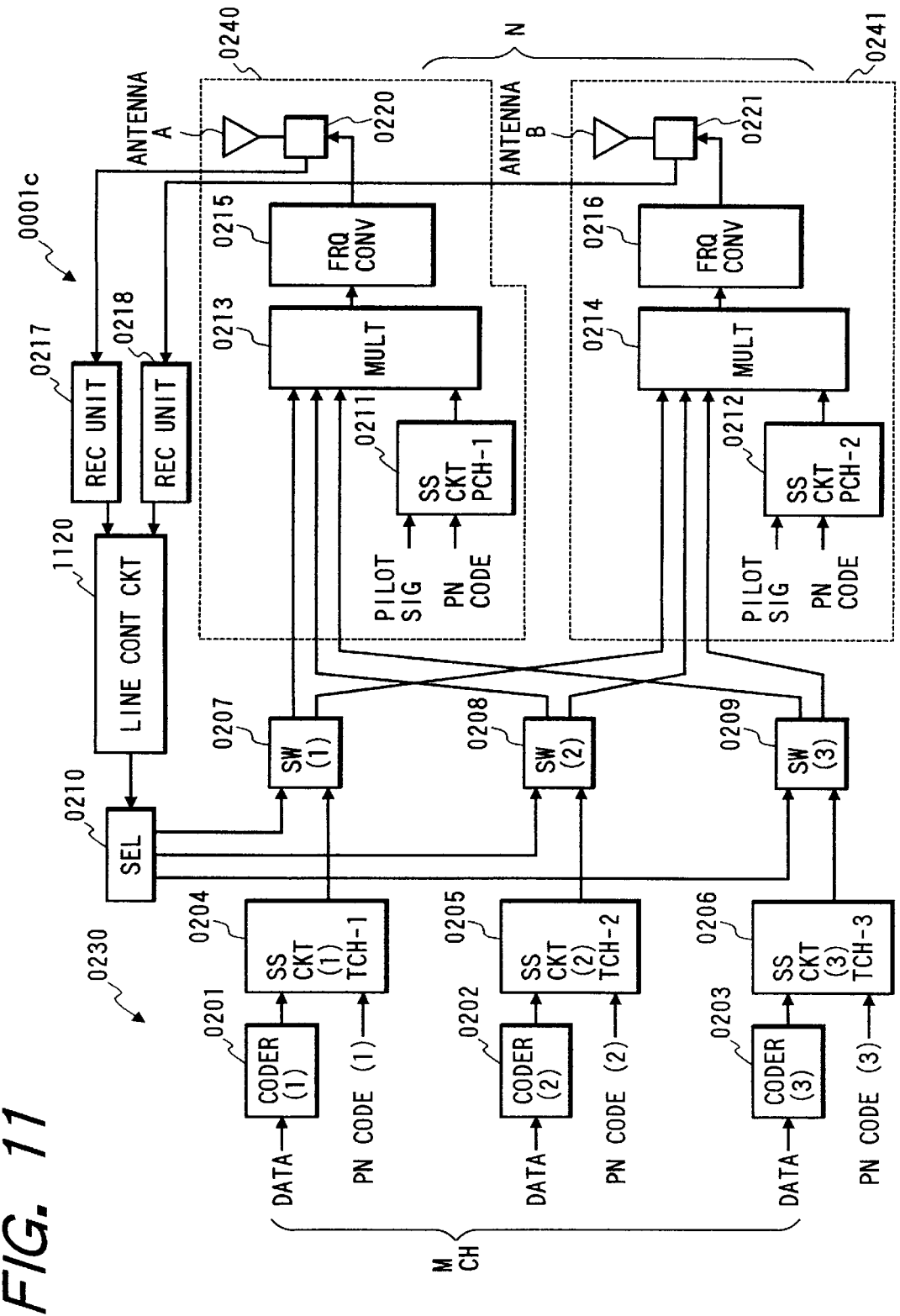
FIG. 11 is a block diagram of the base station of the third embodiment.

FIG. 11 is a block diagram of the base station 0001c of the third embodiment.

The base station 0001c of the third embodiment has substantially the same structure as that of the first embodiment. The difference is that a line control circuit 1120 operates the selection circuit 0210 to select one of the antennas A and B in response to the received switching control signal from the mobile unit communication apparatus 0004c of the third embodiment. The line control circuit 1120 transmits the pilot signal from both antennas A and B at first to enable the mobile unit communication apparatus 0004c to determine which one of the antennas A and B is to be used as mentioned above.

FOURTH EMBODIMENT

FIGS. 12A to 12C are illustrations of a fourth embodiment showing slot formats transmitted from a base station.

In this embodiment, it is assumed that there are two antennas A and B in the base station 0001d. The base station 0001d transmits the pilot signals from the antenna A and the antenna B spectrum-spread by respective pn codes to have the slot 1001 as shown in FIG. 12A. The transmitted data from the antenna A has a slot format as shown in FIG. 12B. The transmitted data from the antenna B has a slot format as shown in FIG. 12C.

The slot format of the data channel of the antenna A has a null data portion 1002 at the top of the slot, a data symbol 1004 at an intermediate portion, a second null data portion 1003 just before the end of the slot, and a second data portion 1005 at the end of the slot. On the other hand, the slot format of the data channel of the antenna B has a data symbol portion 1008 at the top of the slot, a null data portion 1006 just after the data symbol portion 1008, a data symbol 1009 at an intermediate portion, a null data portion 1007 at the end of the slot.

Then, a mobile unit communication apparatus 0004d can detects which one of the antennas A and B transmits the data from the position of the null data.

Figure 13:
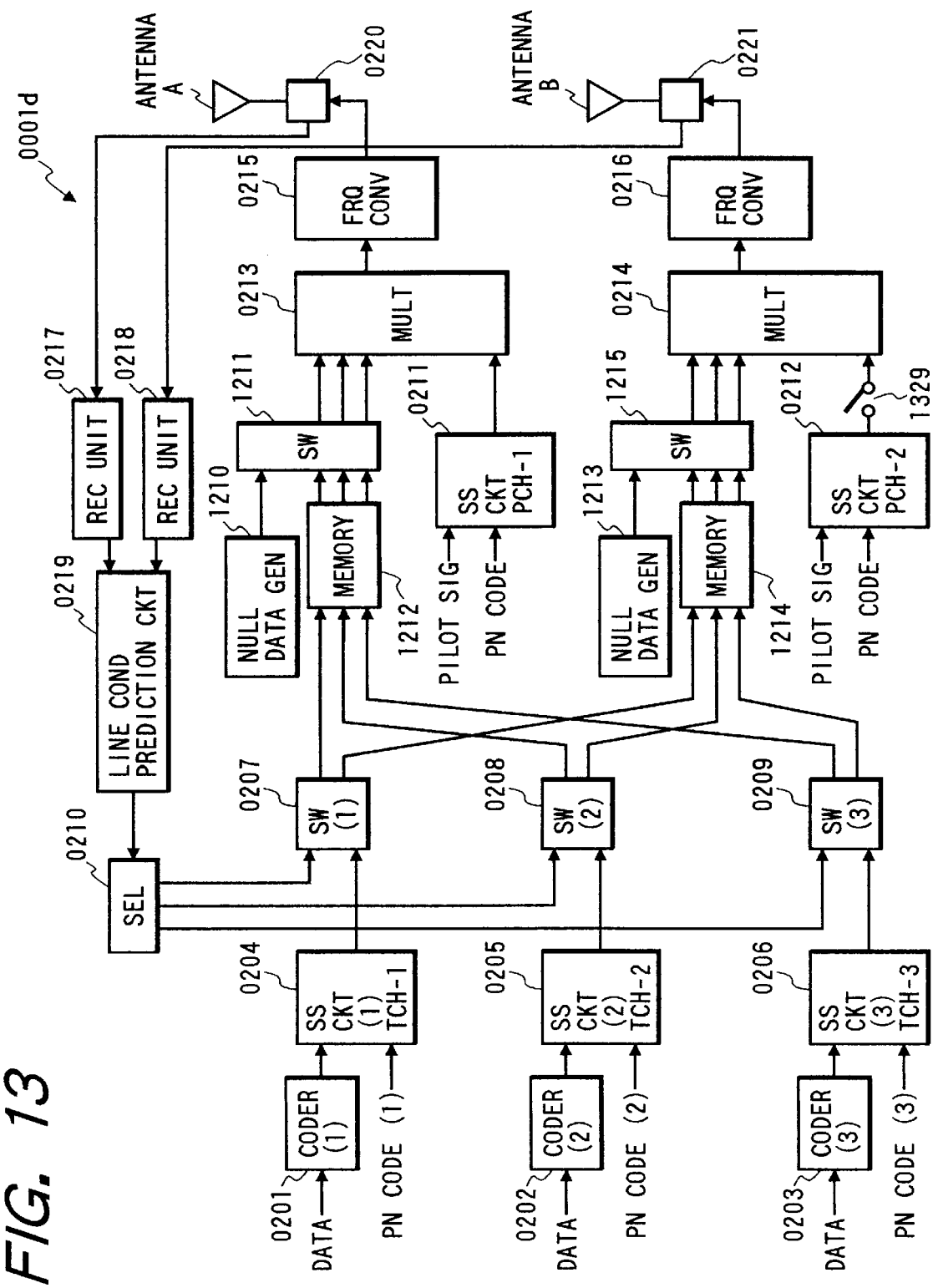
FIG. 13 is a block diagram of a base station of the fourth embodiment.

FIG. 13 is a block diagram of a base station 0001d of the fourth embodiment. The base station 0001d of the fourth embodiment has substantially the same structure as that of the first embodiment. The difference is that a null data generator 1210 for generating the null data, a memory 1212 for temporally storing data from the switch 0207 to 0209, a switch 1211 for supplying either of the null data or the data from the memory 1212 are further provided to generate the slot format shown in FIG. 12B for the line of the antenna A and a null data generator 1213 for generating the null data, a memory 1214 for temporally storing data from the switch 0207 to 0209, a switch 1215 for supplying either of the null data from the null data generator 1213 or the data from the memory 1214 are further provided to generate the slot format shown in FIG. 12C for the line of the antenna B.

The base station 0001d detects the line conditions of the antenna A and antenna B with the target mobile unit communication apparatus 0004d and selects one of the antennas A and B showing a better communication condition. Then, the base station 0001d transmits data with the slot format corresponding to the selected antenna, that is, the slot format shown in FIG. 12B by controlling the memory 1212 and the switch 1211 if the antenna A is used and the slot format shown in FIG. 12C by controlling the memory 1214 and the switch 1215 if the antenna B is used.

Figure 14:
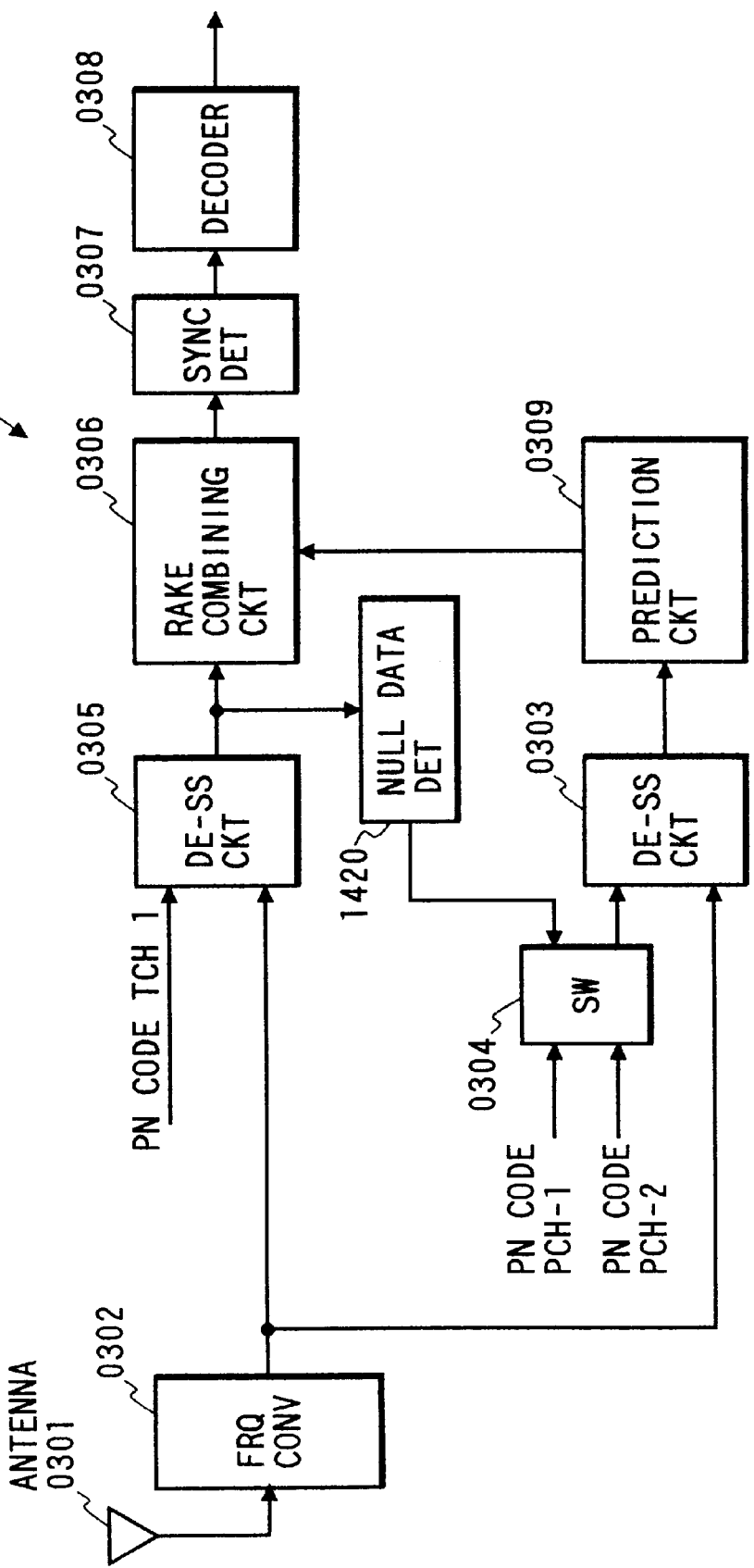
FIG. 14 is a block diagram of a mobile unit communication apparatus of the fourth embodiment.

FIG. 14 is a block diagram of a mobile unit communication apparatus 0004d of the fourth embodiment. The mobile unit communication apparatus 0004d of the fourth embodiment has substantially the same structure as that of the first embodiment. The difference is that null data detector 1420 is further provided. The data detector 1420 detects the null data and the position of the null data in the time slot and generates a switching control signal supplied to the switch 0304 to select the pn code corresponding to the pn code for the antenna used. That is, if the null data is detected at the start of the slot for several symbol periods, it is judged that the data of the slot is transmitted from the antenna A. Then, one of the pn codes PCH-1 and PCH-2 supplied to the switch 0304 is selected instantaneously and then, the data symbols 1004 is correctly received using the selected pn code for spectrum-spreading the pilot signal transmitted. The null data can be detected without the RAKE-combing by the RAKE combining circuit 0306, the synchronous detection by the synchronous detector 0307, and the decoding by the decoder 0308.

If the null data is detected at the portion just after the start of the slot, it is judged that the data of the slot is transmitted from the antenna B and the data is received similarly.

The position of the null data can be detected for only several symbol period. However, if there is phasing, the beginning portion of the slot may not be received. Then, the position of the null data is also detected at the end of the slot. Therefore, it is possible to omit the null data at the end of the time slot.

FIGS. 15A to 15C are another time slot formats of the fourth embodiment. In this case, the transmitted data from the antenna A has the time slot shown in FIG. 15B and the transmitted data from the antenna B has the time slot shown in FIG. 15C.

In this case, the mobile unit communication apparatus similarly detects the null data and the position of the null data in the time slot by the data detector 1420 and generates the switching control signal supplied to the switch 0304 to select the pn code corresponding to the pn code for the antenna used in the base station. Moreover, the dummy data 1105, 1106,1 1112, and 1111 are transmitted with a transmission power less than that of the null data and the transmission data to such an extent that the dummy data can be distinguished from the null data. This suppresses interference to the pilot signal and the dummy data and this provides distinct between the antennas A or B used in the base station. Further, controlling a phase of the dummy data makes an accuracy of determining either of the antenna A or B more accurately.

The switching between the antennas A and B is performed instantaneously in response to the detected line condition in the base station and detecting which one of the antennas A and B is used is performed every slot, so that the lines between the base station and the mobile unit communication apparatus via either of the antenna A or B are switched instantaneously. That is, the information indicating which one of the antenna A and B is used for the target mobile unit communication apparatus is transmitted through the downward line, a delay in selecting which one of the pn codes corresponding to the antenna A and B can be reduced.

FIFTH EMBODIMENT

A communication method of a fifth embodiment will be described.

Figure 16A:
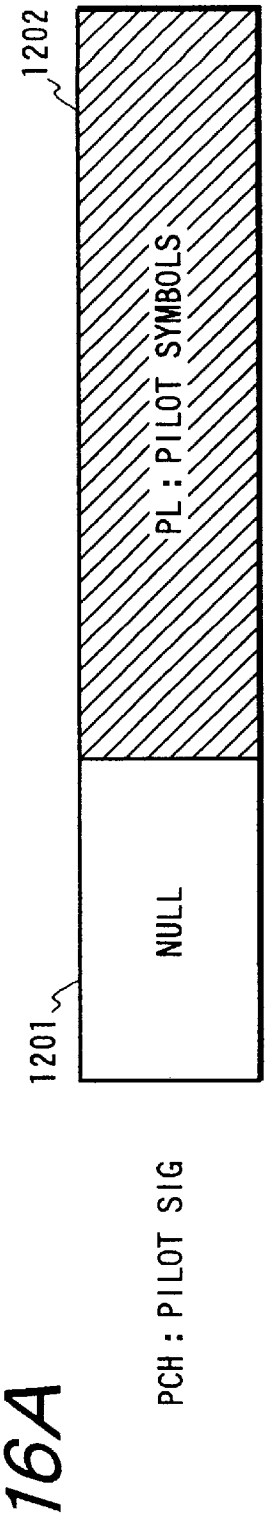
FIGS. 16A and 16B are illustration of slot formats of the pilot signal and data signal of a fifth embodiment.
Figure 16B:
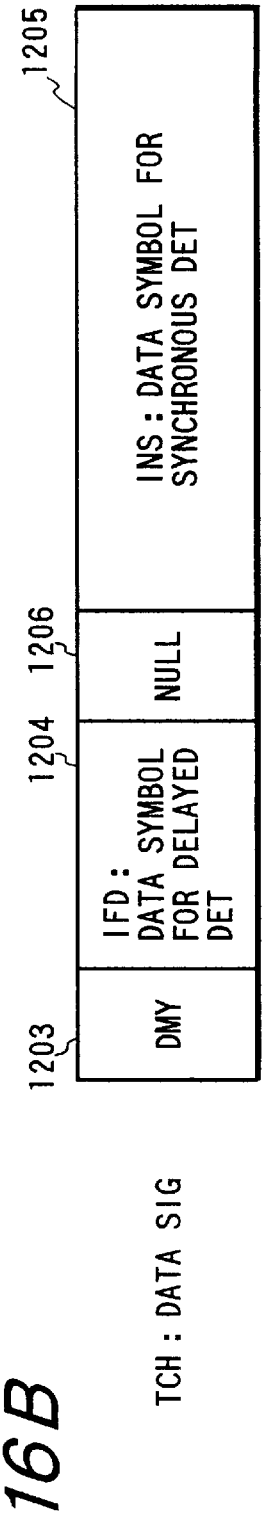

FIGS. 16A and 16B are illustration of slot formats of the pilot signal and data signal of the fifth embodiment.

In this embodiment, it is assumed that there are two antennas in the base station 0001e.

Figure 17:
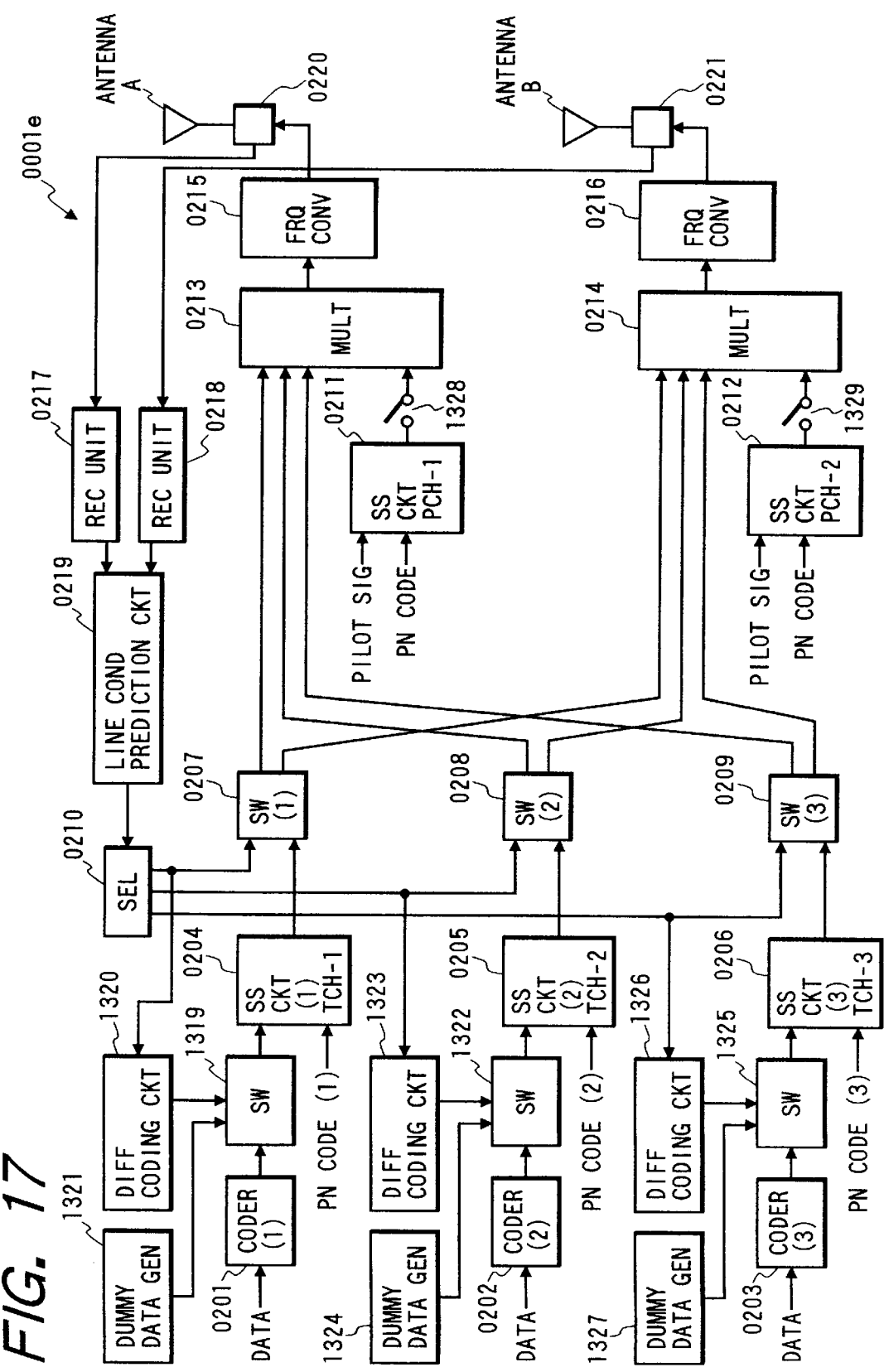
FIG. 17 is a block diagram of a base station of the fifth embodiment.

The time slot of the pilot signal includes a null data portion 1201 at a top portion of the time slot and a pilot symbol portion 1202 following the null data portion 1201. The time slot of the data signal includes a dummy data portion 1203, a data symbol portion 1204 for transmitting data symbol for delayed detection, a null data portion 1206 for transmitting no data, a data symbol portion 1205 for transmitting data symbol which can be detected by the synchronous detection, the null portions 1201 and 1206 are not always necessary. The pilot signal is not transmitted at the null data portion 1201 to reduce interference to the data symbols 1204 for delayed detection FIG. 17 is a block diagram of a base station 0001e of the fifth embodiment.

The base station 0001e of the fourth embodiment has substantially the same structure as that of the first embodiment. The difference is that a differential coding circuit 1320 for generating differentially coded data indicating which antenna is used for the line between the base station 0001e and the target mobile unit communication apparatus 0004e in response to the output of the selector 0210 which also control the switch 0207, a dummy data generator 1321 for generating dummy data for generating dummy data used for decoding the differentially coded data in the target mobile unit communication apparatus, and switch 1319 for generating the slot format shown in FIG. 16B for a first channel are further provided. Moreover, for the second channel, a differential coding circuit 1323, a dummy data generator 1324, and a switch 1322 and for a third channel, a differential coding circuit 1326, a dummy data generator 1327, and a switch 1325 are further provided. Further, switches 1328 and 1329 are provided to generate the null data portion 1201 shown in FIG. 16A.

The line condition prediction circuit 0219 predicts the line conditions between the antenna A and the mobile unit communication apparatus 0004e and 0005 to 0008 and between the antenna B and the mobile unit communication apparatus 0004e and 0005 to 0008 and selects one of the antennas A or B every line or channel. The switch 0207 selects one of the antenna A or B in response to the selection circuit 0210. The selection is made every time slot or every several time slots. Similarly, each of the switches 0208 and 0209 selects one of the antenna A or B in response to the selection circuit 0210. The selection is made every time slot or every several time slots also.

The output of the selector 0210 are also supplied to the differential coding circuit 1302. When the line condition prediction circuit 219 selects the line between the base station 0001e and the target mobile unit communication apparatus 0004e through the antenna A, the differential coding circuit 1320 generates differentially coded data indicating that the antenna A is used for the line between the base station 0001e and the target mobile unit communication apparatus 0004e in response to the output of the selector 0210. The dummy data generator 1321 generates the dummy data used for decoding the differentially coded data in the target mobile unit communication apparatus 0004e. The switch 1319 produces the slot format shown in FIG. 16B using the differentially coded data from the differential coding circuit 1320 and the dummy data from the dummy data generator 1321, and the output of the coder 0201.

In the second and third channels, the differentially coded data indicating which one of the antennas A and B is used are transmitted similarly.

Figure 18:
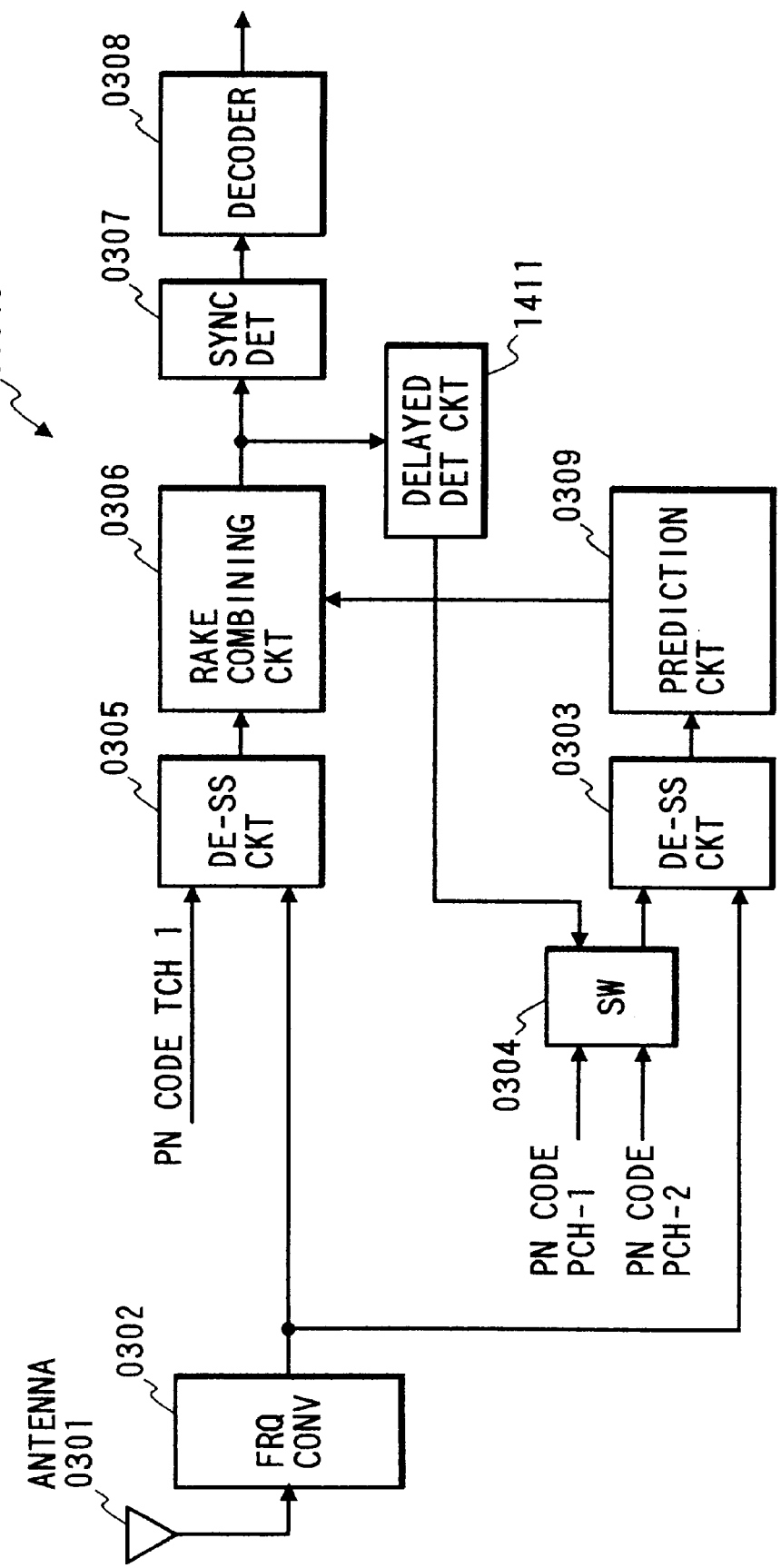
FIG. 18 is a block diagram of a mobile unit communication apparatus of the fifth embodiment.

FIG. 18 is a block diagram of a mobile unit communication apparatus 0004e of the fifth embodiment. The mobile unit communication apparatus 0004e of the fifth embodiment has substantially the same structure as that of the first embodiment. The difference is that a delayed detection circuit 1411 are further provided.

The delayed detection circuit 1411 detects the differentially coded data indicative of the used antenna from the output of the RAKE combining circuit 0306. More specifically, the delayed detection circuit 1411 detects a clock component from the received dummy data transmitted just before the received differential coded data. That is, the delayed detecting the differentially coded data can be detected without the synchronous detection, that is, it does not require the result from the prediction circuit 0309. Then, the delayed detection circuit 1411 detects the data indicative of the used antenna and operates the switch 0304 to select the pn code corresponding to the used antenna. Then, the prediction circuit 0309 supplies the prediction result from the received pilot symbol to the RAKE combining circuit 0306. The RAKE combining circuit 0306 receives the data symbols 1205 in accordance with the prediction result from the prediction circuit 0309 and then, the data symbols 1205 are synchronously detected using the prediction result of the pilot signal. The decoder 0308 outputs the decoded output.

SIXTH EMBODIMENT

A communication method, a base station, and a mobile unit communication apparatus of a six embodiment will be described.

In this embodiment, it is assumed that the base station 0001f transmits the pilot signal PCH-1 from the antenna A and the pilot signal PCH-2 from the antenna B which are spectrum-spread with pn codes assigned to respective antennas A and B. The base station 0001f transmits the data and error coded data to the target mobile unit communication apparatus 0004f by the selected antenna showing a better line condition. The transmitted data is received by the target mobile unit communication apparatus 0004f and is de-spectrum-spread with the pn code assigned to the target mobile unit communication apparatus 0004f and errors are detected using the received error coded data.

Figure 19:
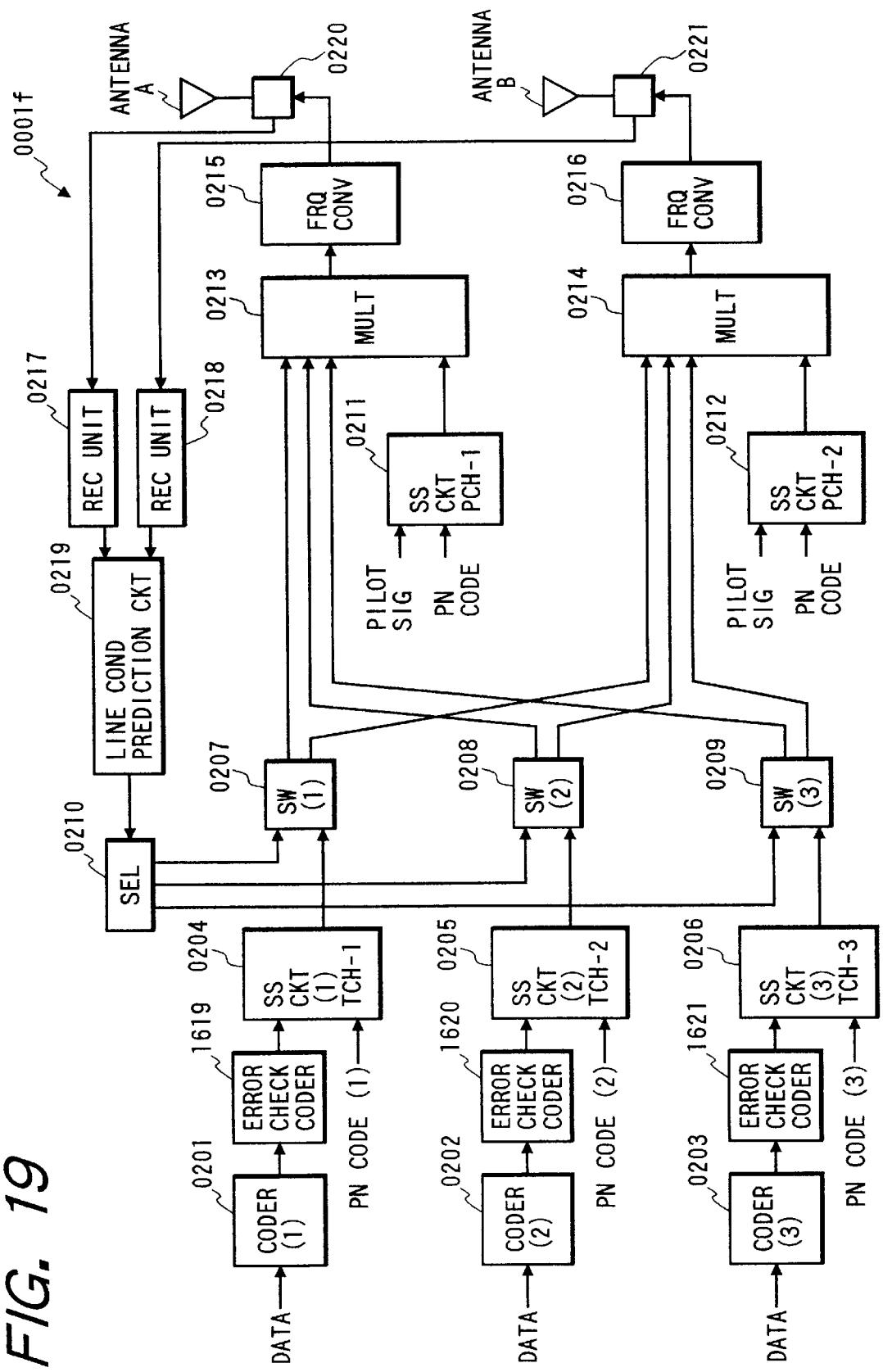
FIG. 19 is a block diagram of a base station of a sixth embodiment.

FIG. 19 is a block diagram of a base station of the sixth embodiment.

The base station 0001f of the fifth embodiment has substantially the same structure as that of the first embodiment. The difference is that error check coders 1819 to 1621 are further provided.

The error check coder 1619 generates error check codes from the coded data from the coder 0201 and adds the error check code to the coded data and supplies the coded data with the error check codes to the spectrum-spreading circuit 0204. The error check coders 1620 and 1621 similarly generate error check codes from the coded data from the coders 0202 and 0203 and adds the error check code to the coded data and supply the coded data with the error check code to the spectrum-spreading circuits 0205 and 0206 respectively.

The base station 0001f predicts a line condition from the received signal from the mobile unit communication apparatus 0004f and selects one of the antenna A or the antenna B showing a better line condition between the base station 0001f and the mobile unit communication apparatus 0004f. Similarly, the base station 0001f selects one of the antennas A and B every mobile unit communication apparatus 0005 to 0008. The base station 0001f determines the selection of the antennas for every mobile unit communication apparatus 0004f and 0005 to 0008 every time slot or every several time slots.

Figure 20:
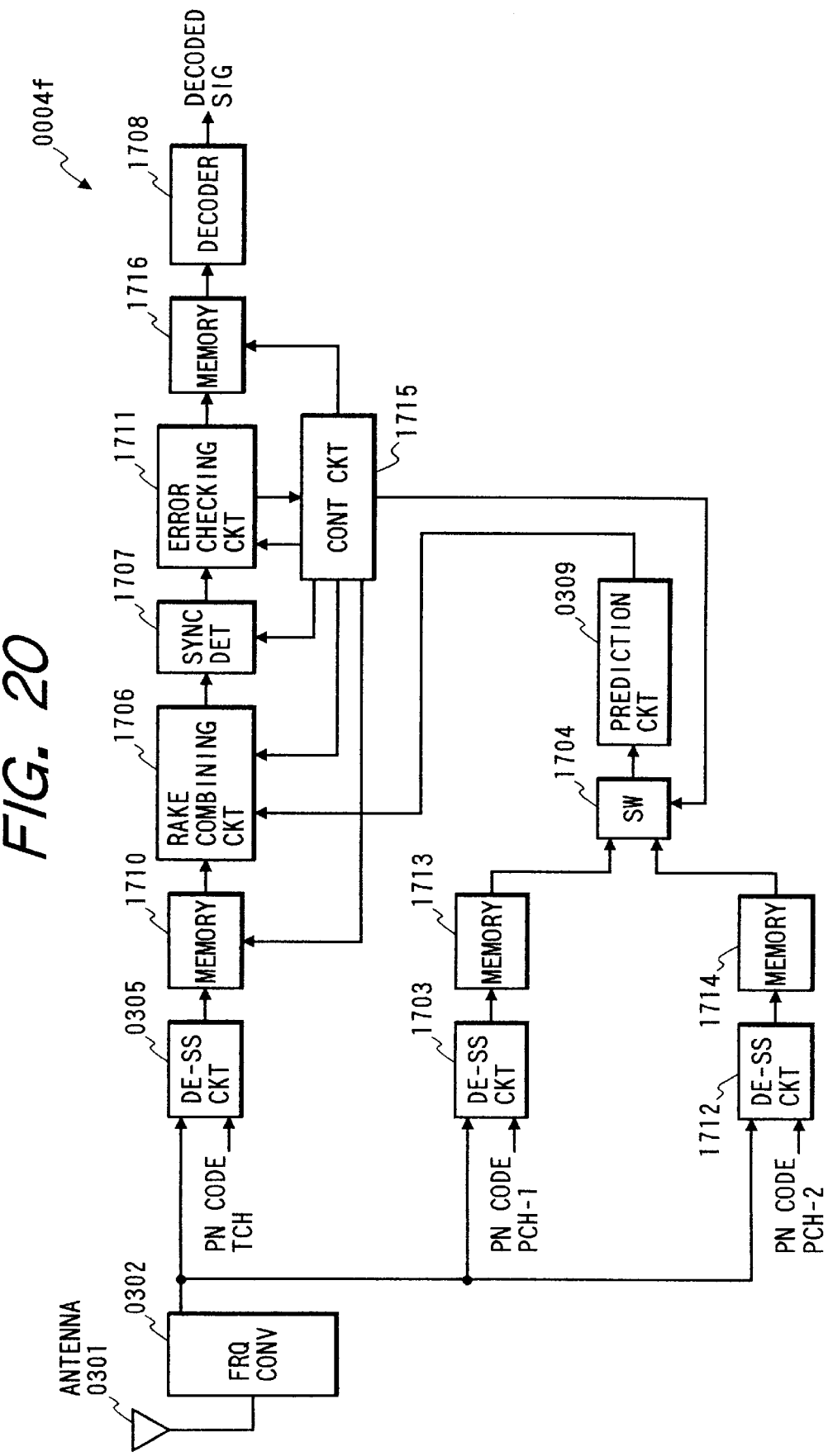
FIG. 20 is a block diagram of a mobile unit communication apparatus of the sixth embodiment.

FIG. 20 is a block diagram of a mobile unit communication apparatus of the sixth embodiment. The mobile unit communication has a structure similar to that of the first embodiment. The mobile unit communication apparatus 0004f of the sixth embodiment comprises the antenna 0301 for receiving the radio wave signal transmitted from the base station 0001f, the frequency converter 0302 for frequency-converting the received radio wave signal into the base band signal, the de-spectrum-spreading circuit 0305 for de-spectrum-spreading the base band signal from the frequency converter 0302 with the pn code assigned to the mobile unit communication apparatus, a memory 1710 for storing the correlation result from the de-spectrum-spreading circuit 0305, a de-spectrum-spreading circuit 1703 for de-spectrum-spreading the base band signal from the frequency converter 0302 with the pn code PCH-1 corresponding to the pn code used for the antenna A, a memory 1713 for storing the correlation result of the de-spectrum-spreading circuit 1703, a de-spectrum-spreading circuit 1712 for de-spectrum-spreading the base band signal from the frequency converter 0302 with the pn code PCH-2 corresponding to the pn code used for the antenna B, a memory 1714 for storing the correlation result of the de-spectrum-spreading circuit 1712, a switch 1704 outputting the correlation result of the de-spreading circuit 1703 or the de-spectrum-spreading circuit 1712 from the memory 1713 or the 1714, the prediction circuit 0309 for predicting a line condition in accordance with a correlation result from the switch 1704, and the RAKE combining circuit 0306 for RAKE-combining correlation results from the memory 1710 in accordance with the predicted line condition, the synchronous detection circuit 1707 for effecting synchronous detection to an output of the RAKE combining circuit 1706, an error correction circuit 1711 for detecting error from the received error check codes and outputting error corrected data and an error detection result, a memory 1716, the decoder 1708 for decoding the error corrected data via the memory 1716 and outputting a decoded signal, and a control circuit 1715 for controlling the memory 1710, the RAKE combining circuit 1706, the memory 1716, the synchronous detection circuit 1707, and the decoder 1708.

An operation of the mobile unit communication apparatus of the sixth embodiment will be described.

Figure 21:
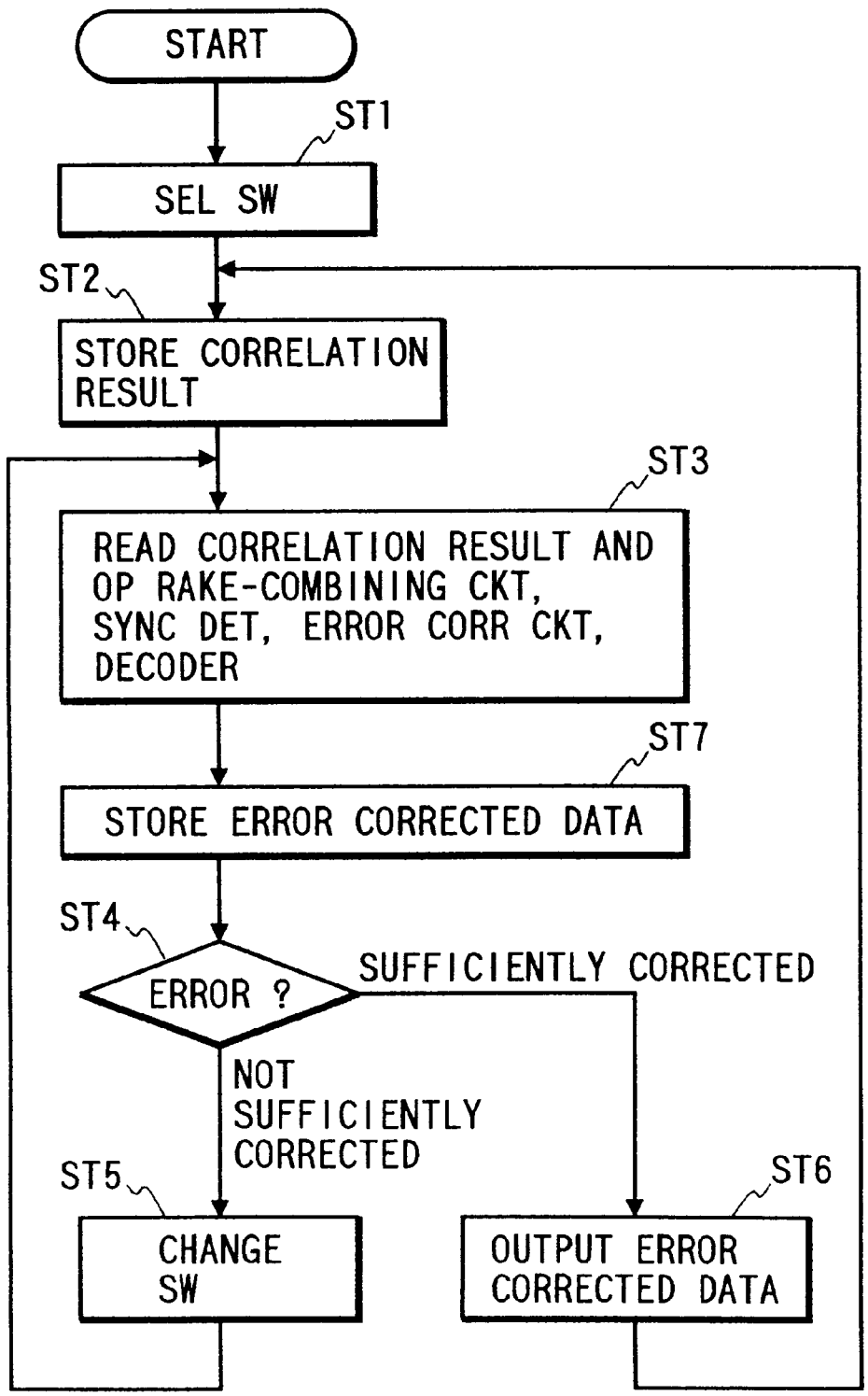
FIG. 21 depicts a flow chart of the control circuit of the sixth embodiment.

FIG. 21 depicts a flow chart of the control circuit of the sixth embodiment.

The antenna 0301 receives the radio wave signal transmitted from the base station 0001f. The frequency converter 0302 frequency-converts the received radio wave signal into the base band signal. The de-spectrum-spreading circuit 0305 for de-spectrum-spreading the base band signal from the frequency converter 0302 with the pn code assigned to the mobile unit communication apparatus.

The de-spectrum-spreading circuit 1703 de-spectrum-spreads the base band signal from the frequency converter 0302 with the pn code PCH-1 corresponding to the pn code used for the antenna A. The memory 1713 stores the correlation result of the de-spectrum-spreading circuit 1703

The de-spectrum-spreading circuit 1712 de-spectrum-spreads the base band signal from the frequency converter 0302 with the pn code PCH-2 corresponding to the pn code used for the antenna B. The memory 1714 stores the correlation result of the de-spectrum-spreading circuit 1712. The prediction circuit 0309 predicts a line condition in accordance with the correlation result from the switch 1704.

The control circuit 1715 operates the switch 1704 to select one of the output of the memories 1713 and 1714, i.e., the output of the memory 1713 at first in step st1. In the following step st2, the control circuit 1715 operates the memory 1710 to store the correlation result from the de-spectrum-spreading circuit 0305. Then, the control circuit 1715 reads the correlation result from the memory 1710 to supply the correlation result to the RAKE combining circuit 1706 and operates the RAKE combing circuit 1706, the synchronous detection circuit 1707, and the decoder 1708 in step st3.

Then, the RAKE combining circuit 0306 RAKE-combines correlation results from the memory 1710 in accordance with the line condition predicts in accordance with the pn code for the antenna A of the base station. The synchronous detection circuit 1707 effects synchronous detection to the output of the RAKE combining circuit 1706. The error correction circuit 1711 error-corrects the data and detects errors from the received error check codes and supplies the error detection result to the switch control circuit 1715.

The control circuit 1715 stores the error-corrected data in the memory 1716 in step st7.

In the following step st4, the control circuit 1715 judges whether the data is corrected sufficiently, that is, the data is corrected to a predetermined extent. If the data is corrected sufficiently, the control circuit 1715 operates the memory 1716 to supply the error-corrected data to the decoder 1708 in step st6. Then, the decoder 1708 decodes the error-corrected data and stores the decoded result. Then, processing returns to step st2 to continue the receiving operation.

In step st4, if the data is not sufficiently corrected, the control circuit 1715 generates the switch control signal to change over the switch 1704 to supply another output of the memory 1714 to the prediction circuit 0309.

Then, the prediction circuit 0309 predicts the line condition with the pn code corresponding to the antenna B and supplies the predicted line condition to the RAKE combining circuit 1706. Then, processing returns to step st3. In step st3, the control circuit 1715 reads the correlation result from the memory 1710 again to supply the same correlation result to the RAKE combining circuit 1706 and operates the RAKE combining circuit 1706, the synchronous detection circuit 1707, the error correction circuit 1711, and the memory 1716.

Then, the RAKE combining circuit 0306 RAKE-combines correlation results from the memory 1710 in accordance with the line condition predicts in accordance with the pn code for the antenna B of the base station 0001*f*. The synchronous detection circuit 1707 effects synchronous detection to the output of the RAKE combining circuit 1706.

In the following step st4, the control circuit 1715 judges whether the data is sufficiently corrected again. If there is no error, which means that the antenna B is used, the control circuit 1715 operates the decoder 1708 and output the decoded signal.

SEVENTH EMBODIMENT

A communication method, a base station, and a mobile unit communication apparatus of a seventh embodiment will be described.

In this embodiment, it is assumed that the base station transmits the pilot signal PCH-1 from the antenna A and the pilot signal PCH-2 from the antenna B which are spectrum-spread with pn codes assigned to respective antennas A and B. The base station 0001*g* transmits the data and error coded data to the target mobile unit communication apparatus 0004*g* by the selected antenna showing a better line condition. The transmitted data is received by the target mobile unit communication apparatus 0004*g* and is de-spectrum-spread with the pn code assigned to the target mobile unit communication apparatus 0004*g* and errors are detected using the received error coded data.

Figure 22:
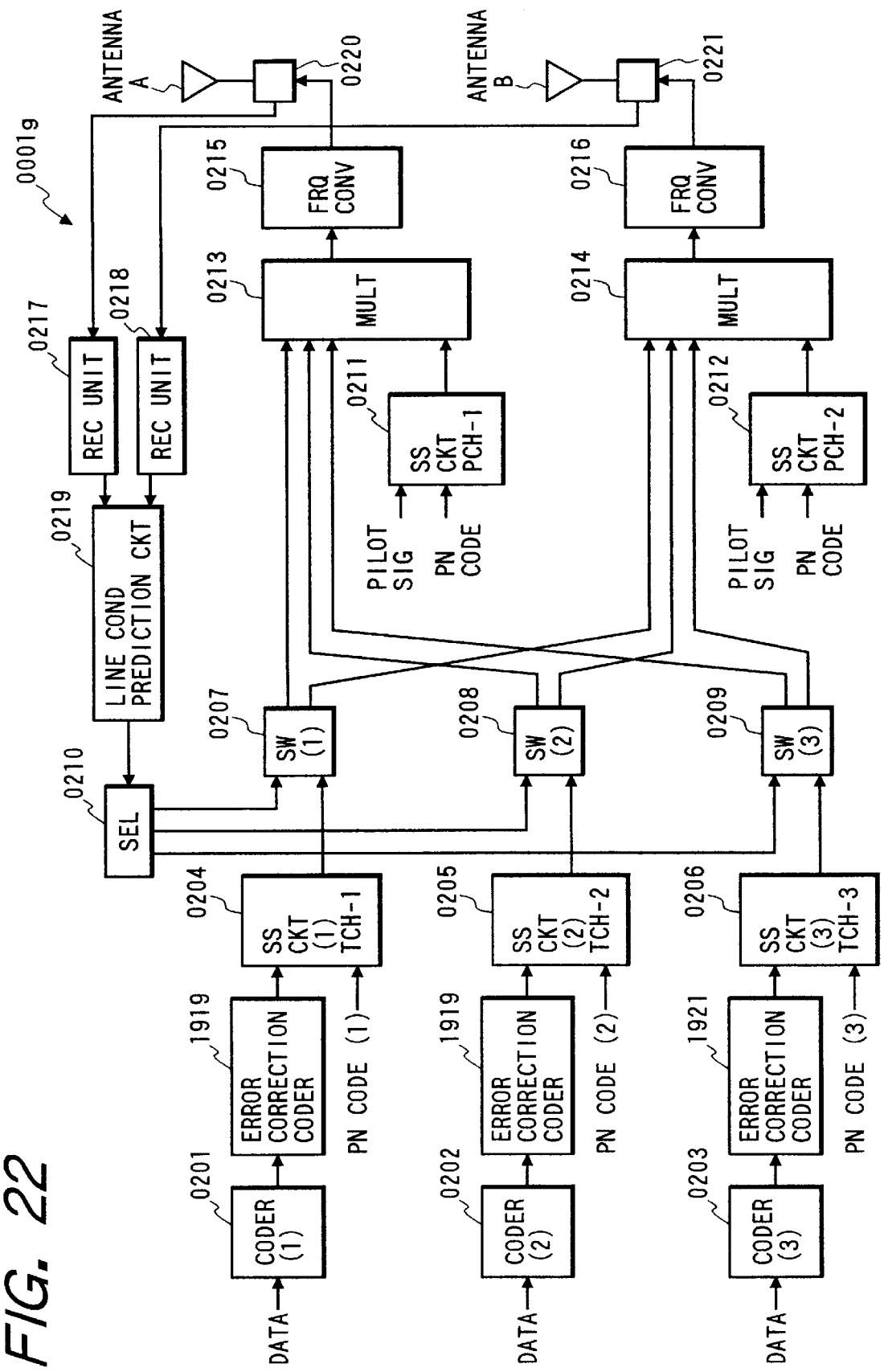
FIG. 22 is a block diagram of a base station of a seventh embodiment.

FIG. 22 is a block diagram of a base station 0001*g* of the seventh embodiment.

The base station 0001*g* of the seventh embodiment has substantially the same structure as that of the sixth embodiment. The difference is that error correction coders 1919 to 1921 replace the error check coders 1619 to 1621.

The error correction coder 1919 generates error correction codes from the coded data from the coder 0201 and adds the error correction code to the coded data and supplies the coded data with the error correction code to the spectrum-spreading circuit 0204. The error correction coders 1920 and 1921 similarly generate error correction codes from the coded data from the coders 0202 and 0203 and add the error correction code to the coded data and supply the coded data with the error correction code to the spectrum-spreading circuits 0205 and 0206 respectively.

The base station 0001*g* predicts a line condition from the received signal from the mobile unit communication apparatus 0004 and selects one of the antenna A and the antenna B showing a better line condition between the base station 0001*g* and the mobile unit communication apparatus 0004*g*. Similarly, the base station 0001*g* selects one of the antennas A and B every mobile unit communication apparatus 0005 to 0008. The base station 0001*g* determines the selection of the antennas for every mobile unit communication apparatus 0004*g* to 0008 every time slot or every several time slots.

Figure 23:
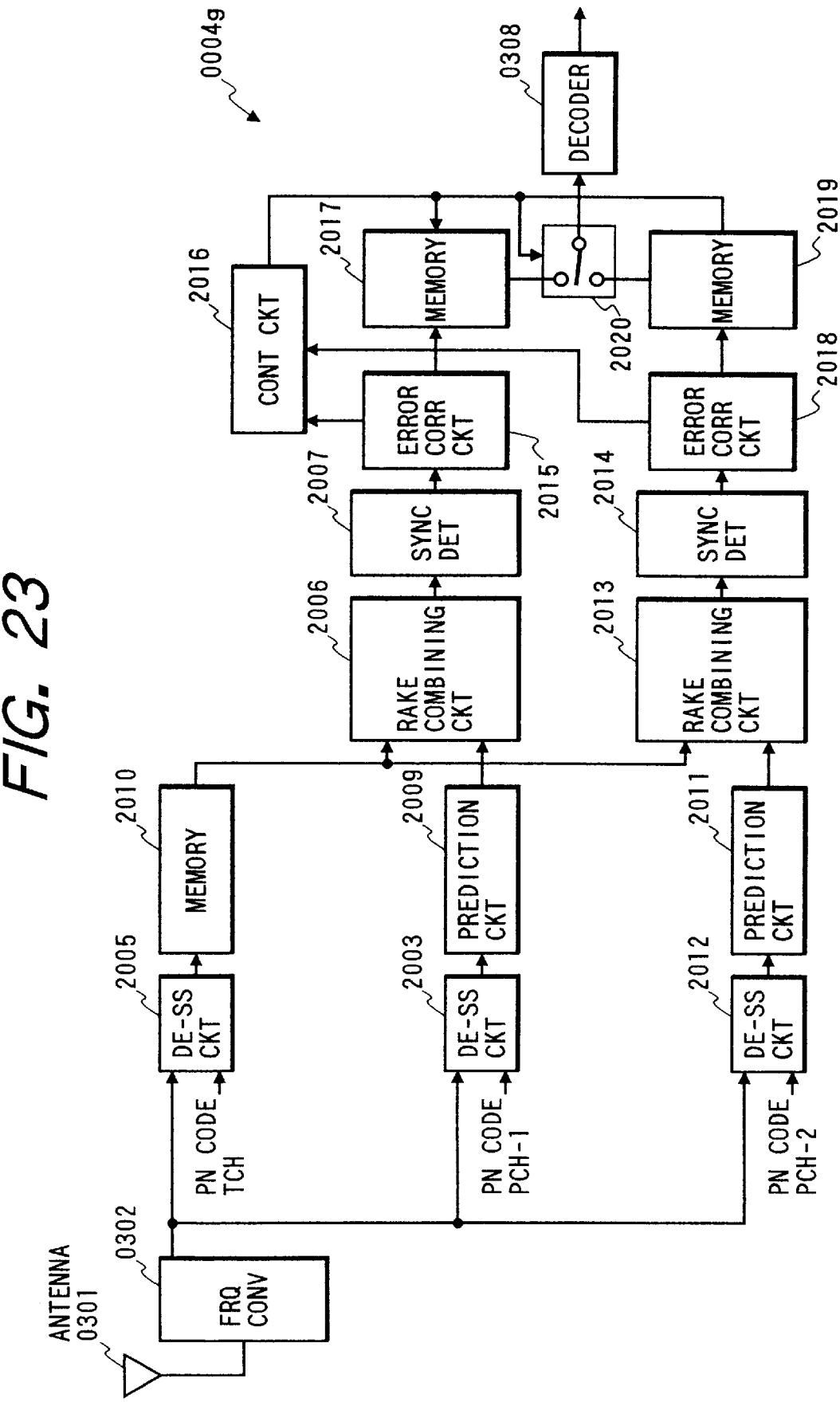
FIG. 23 is a block diagram of a mobile unit communication apparatus of the seventh embodiment.

FIG. 23 is a block diagram of a mobile unit communication apparatus 0004*g* of the seventh embodiment. The mobile unit communication apparatus 0004*g* of the seventh embodiment comprises the antenna 0301 for receiving the radio wave signal transmitted from the base station 0001*g*, the frequency converter 0302 for frequency-converting the received radio wave signal into the base band signal, the de-spectrum-spreading circuit 2005 for de-spectrum-spreading the base band signal from the frequency converter 0302 with the pn code assigned to the mobile unit communication apparatus 0001*g*, a memory 2010 for storing the correlation result from the de-spectrum-spreading circuit 2005, a de-spectrum-spreading circuit 2003 for de-spectrum-spreading the base band signal from the frequency converter 0302 with the pn code PCH-1 corresponding to the pn code used for the antenna A, a prediction circuit 2009 for predicting a line condition between the base station 0001*g* and this mobile unit communication apparatus 0004*g* with respect to the pn code PCH-1 in accordance with a correlation result from de-spectrum spreading circuit 2003, a de-spectrum-spreading circuit 2012 for de-spectrum-spreading the base band signal from the frequency converter 0302 with the pn code PCH-2 corresponding to the pn code used for the antenna B, a prediction circuit 2011 for predicting a line condition between the base station 0001*g* and this mobile unit communication apparatus 0004*g* with respect to the pn code PCH-2 in accordance with a correlation result from de-spectrum spreading circuit 2012, a RAKE combining circuit 2006 for RAKE-combining correlation results from the memory 2010 in accordance with the predicted line condition from the prediction circuit 2009, a synchronous detection circuit 2007 for effecting synchronous detection to an output of the RAKE combining circuit 2006, an error correction circuit 2015 for error-correcting an output of the synchronous detection circuit 2007 and generating a syndrome, a memory 2017 for storing the error corrected data, a RAKE combining circuit 2013 for RAKE-combining correlation results from the memory 2010 in accordance with the predicted line condition from the prediction circuit 2011, a synchronous detection circuit 2014 for effecting synchronous detection to an output of the RAKE combining circuit 2013, the error correction circuit 2018 for error-correcting an output of the synchronous detection circuit 2014 and generating a syndrome, a switch 2020, a memory 2019 for storing the error corrected data, a control circuit for judging which one of syndrome showing a best line condition and controlling the switch 2020 to output the error corrected data showing the syndrome representing a best line condition.

An operation of the mobile unit communication apparatus of the seventh embodiment will be described.

The antenna 0301 receives the radio wave signal transmitted from the base station 0001. The frequency converter 0302 frequency-converts the received radio wave signal into the base band signal. The de-spectrum-spreading circuit 2005 de-spectrum-spreads the base band signal from the frequency converter 0302 with the pn code assigned to the mobile unit communication apparatus. The memory 2010 stores the correlation result from the de-spectrum-spreading circuit 2005.

The de-spectrum -spreading circuit 2003 de-spectrum-spreads the base band signal from the frequency converter 0302 with the pn code PCH-1 corresponding to the pn code used for the antenna A. The prediction circuit 2009 predicts a line condition between the base station and this mobile unit communication apparatus with respect to the pn code PCH-1 in accordance with a correlation result from de-spectrum spreading circuit 2003. The RAKE combining circuit 2006 RAKE-combines the correlation results from the memory 2010 in accordance with the predicted line condition from the prediction circuit 2009. The synchronous detection circuit 2007 effects synchronous detection to an output of the RAKE combining circuit 2006. The error correction circuit 2015 error-corrects the output of the synchronous detection circuit 2007 and generates the syndrome. The memory 2017 stores the error corrected data, The RAKE combining circuit 2013 RAKE-combines the correlation results from the memory 2010 in accordance with the predicted line condition from the prediction circuit 2011. The synchronous detection circuit 2014 effects synchronous detection to an output of the RAKE combining circuit 2013. The error correction circuit 2018 error-corrects the output of the synchronous detection circuit 2014 and generates the syndrome. The memory 2019 temporary stores the error corrected data. The control circuit 2016 judges which one of syndrome showing the best line condition and controls the switch 2020 to output the error corrected data showing the syndrome representing a best line condition.

FIG. 24 is a table of the seventh embodiment.

The error correction circuits 2015 and 2018 respectively generate N sets of the syndromes and probabilities with respect to the pn codes PCH-1 and PCH-2 from the error correction results. The control circuit 2016 judges which one of the antennas A and B transmits the radio wave signal to this mobile unit communication apparatus from the N sets of the syndromes and probabilities. That is, in the syndrome s4, the probability is 100, so that the error correction decoding circuit predicts that the antenna A transmits the radio wave from the base station.

EIGHTH EMBODIMENT

A method of communication, a base station, and a mobile unit communication apparatus of an eighth embodiment will be described.

Figure 25:
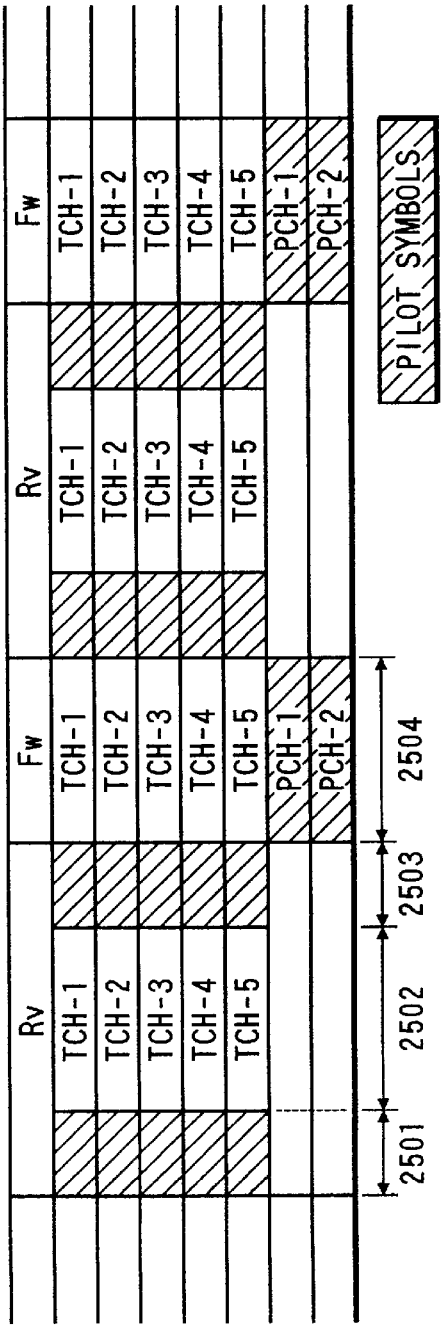
FIG. 25 is a time chart of communication of the seventh embodiment.

FIG. 25 is a time chart of forward and backward (downward and upward) communication of the eighth embodiment.

In this embodiment, downward transmitting and upward transmitting is performed in the TDD (time division duplex) method and on the downward (forward) lines, the pilot signal is spectrum-spread every antenna and transmitted multiplexed with the transmission data as similar to earlier embodiments. On the other hand, on the upward lines (backward lines), it is difficult to multiplex the pilot signal with the transmission data because an amount of interference by the pilot signal is considerably high. Therefore, in this embodiment, on the upward line, the pilot signal and transmission data are transmitted to the base station in a time-division method in the upward time slot. Then, the period of the upward time slot including the pilot signal transmission periods 2501 and 2503 and the data transmission period 2504 is longer than the period of the downward time slot, because the transmission period of the transmission data TCH of the upward transmission is the same as that of the downward transmission.

Figure 26:
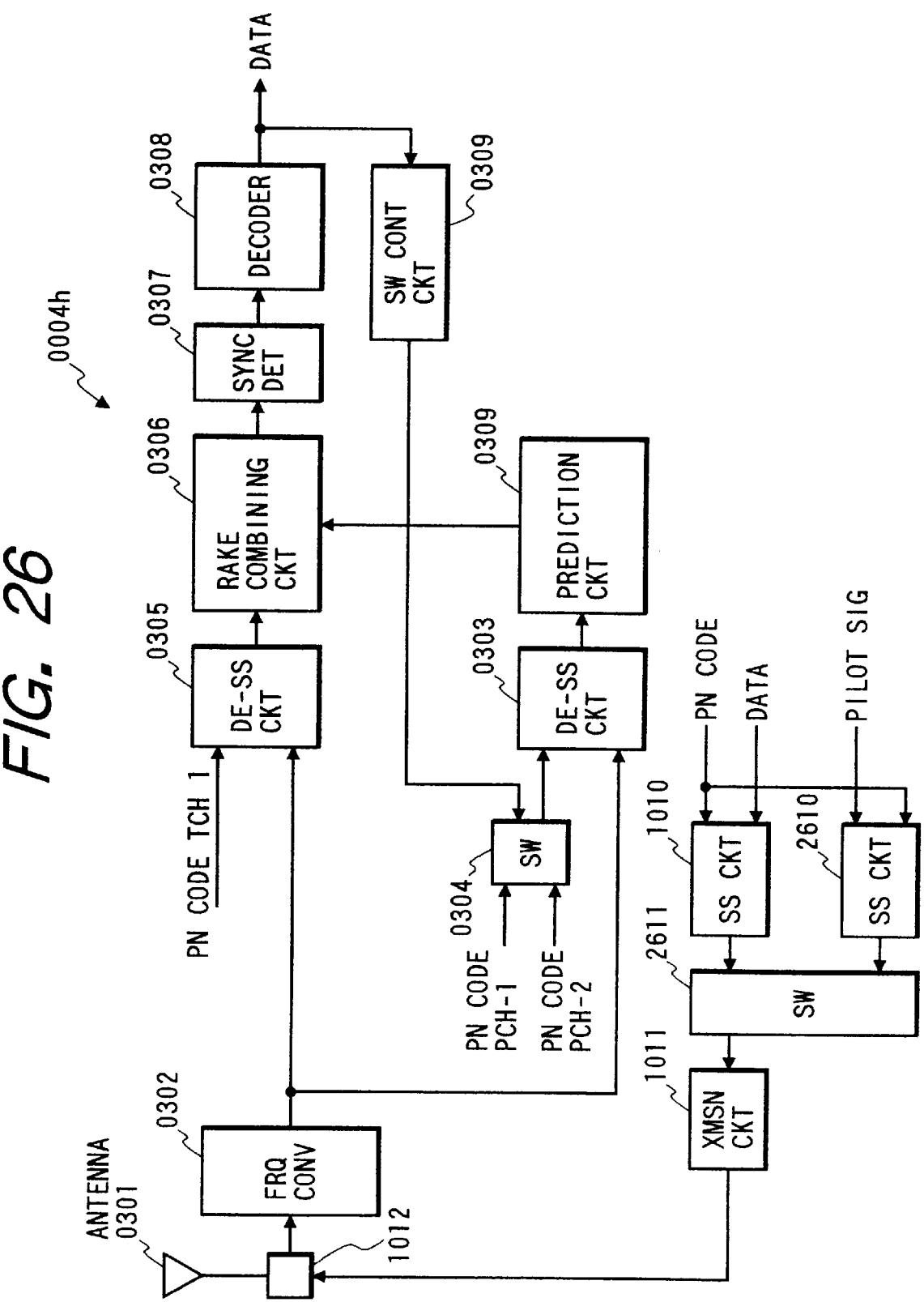
FIG. 26 is a block diagram of a mobile unit communication apparatus of an eighth embodiment.

FIG. 26 is a block diagram of a mobile unit communication apparatus 0004h of the eighth embodiment. The mobile unit communication apparatus 0004h of the eighth embodiment is substantially the same as that of the third embodiment. The difference is that a spectrum spreading circuit 2610 for spectrum-spreading the pilot signal with the pn code assigned to this mobile unit communication apparatus and a switch 2610 for either supplying the spectrum-spread data or the spectrum-spread pilot signal are further provided. The spectrum spreading circuit 1010 spectrum-spreads the transmission data with the pn code assigned to this mobile unit communication apparatus. The switch 2610 supplies either the spectrum-spread data or the spectrum-spread pilot signal as shown by the format in FIG. 25.

Figure 27:
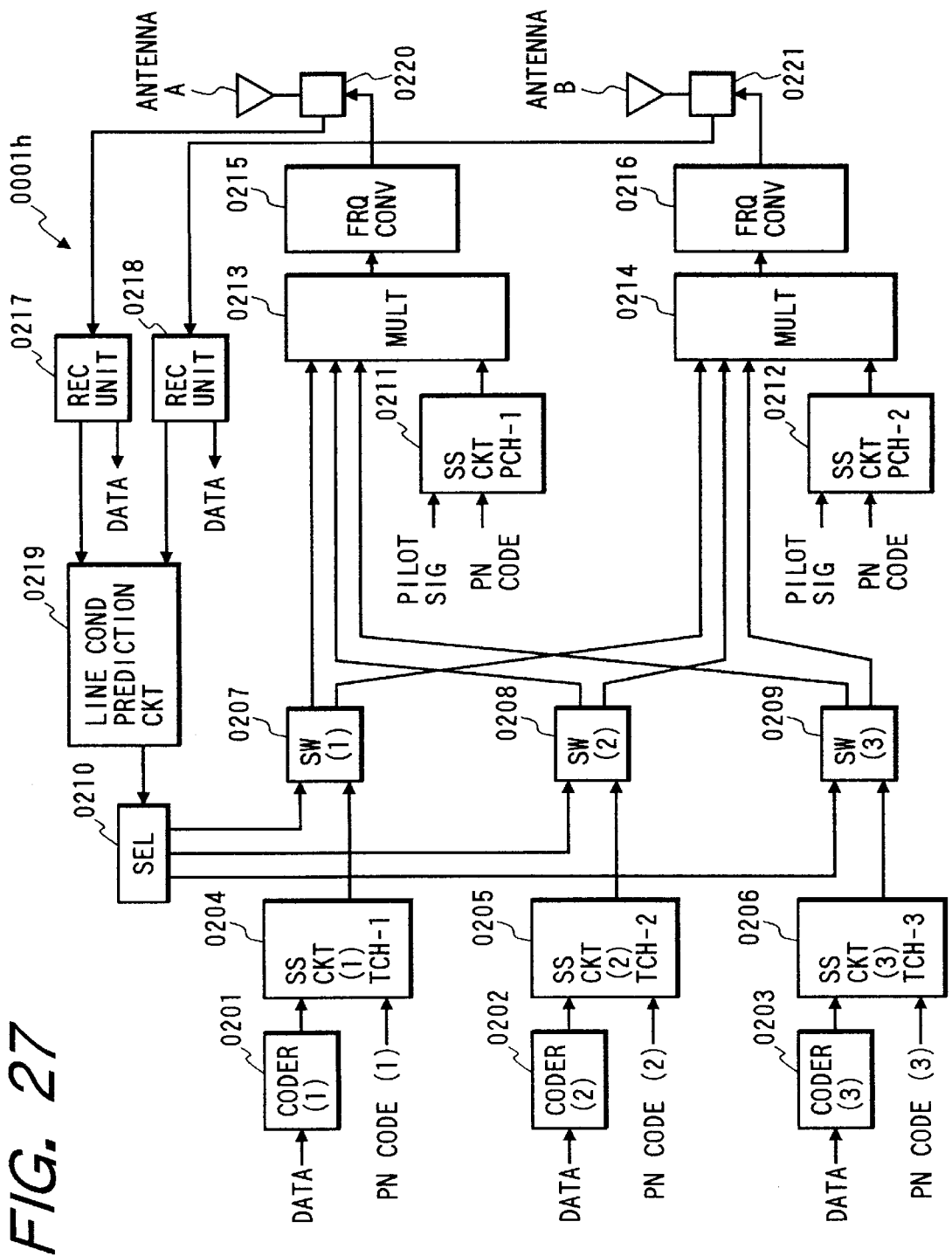
FIG. 27 is a block diagram of a base station of the eighth embodiment.

FIG. 27 is a block diagram of a base station 0001h of the eighth embodiment. The base station 0001h of the eighth embodiment is substantially the same as that of the third embodiment. The receiving units 0217 and 0218 receive the radio wave signals including the spectrum-spread transmission data and the spectrum-spread pilot signals from the antennas A and B respectively. The line condition prediction circuit 0219 predicts the lines via the antennas A and B. The selector 0210 selects the antennas for transmission by controlling the switches 0207 to 0209.

Figure 28:
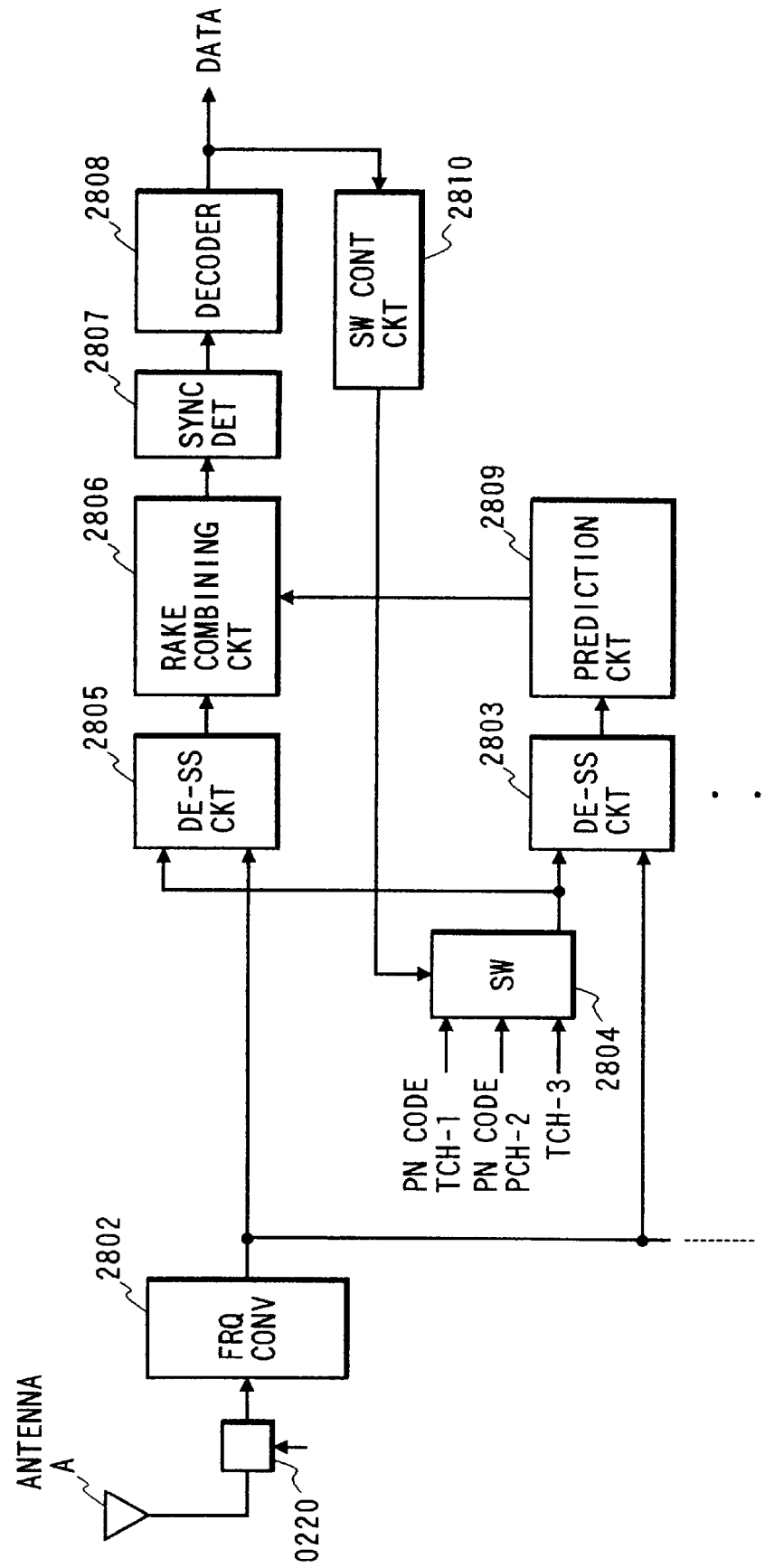
FIG. 28 is a block diagram of the receiving units of the eight embodiment.

FIG. 28 is a block diagram of each of receiving circuits included in the receiving units 0217 and 0218. The receiving circuit is substantially the same as the receiving circuit of the mobile unit communication apparatus 0004a of the first embodiment shown in FIG. 4. The difference is in that the pn code for de-spectrum-spreading the transmission data, which is assigned to the target mobile unit communication apparatus 0004h is used as the pn code for de-spectrum-spreading the pilot signal.

Each of the receiving units 0217 and 0218 includes a plurality of receiving circuits. The frequency converter 2802 frequency-converts the received radio wave signal into a base band signal. In each of the receiving circuits, the de-spectrum-spreading circuit 2805 de-spectrum-spreads the base band signal from the frequency converter 2802 with the pn code assigned to the mobile unit communication apparatus. The switch 2804 outputs one of pn codes for the pilot signal assigned to the target mobile unit communication apparatus. The de-spectrum-spreading circuit 2803 de-spectrum-spreads the base band signal from the frequency converter 2802 with the pn code from the switch 2804. The prediction circuit 2809 predicts a line condition in accordance with a correlation result from the de-spectrum spreading circuit 2803. The RAKE combining circuit 2806 RAKE-combines the correlation results of the data in accordance with the predicted line condition. The synchronous detection circuit effects the synchronous detection to an output of the RAKE combining circuit 2806. The decoder 2808 decodes an output of the synchronous detection circuit 2807 and outputs a decoded data. The switch control circuit 2809 generates a switching control signal supplied to the switch 2804 in accordance with the decoded data to select the pn code assigned to the target mobile unit communication apparatus for de-spreading the received pilot signal.

Figure 29:
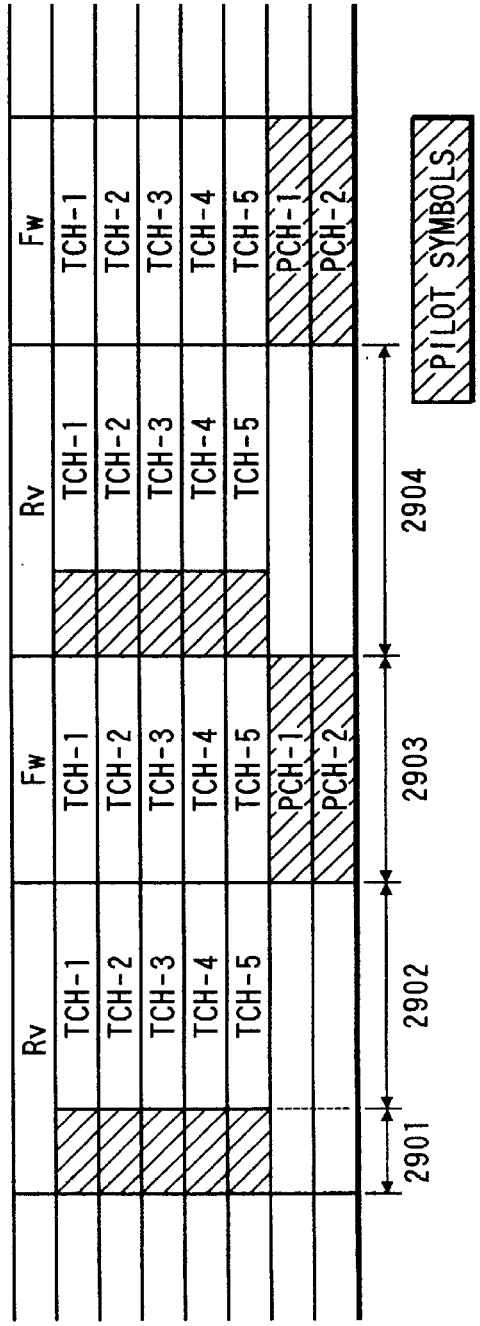
FIG. 29 shows a modified time slot format of the eighth embodiment.

In the time slot format shown in FIG. 25, the pilot symbols are transmitted twice in one upward time slot. However, it is also possible to omit the secondly transmitted pilot symbol in the same time slot and it is also possible to expand the transmission periods of the data in the upward and downward transmission periods. FIG. 29 shows such a modified time slot format of the eighth embodiment. The period of the upward time slot including the pilot signal transmission period 2901 and the data transmission period 2902. The period of the downward time slot includes the data transmission period 2903. The upward time slot includes the data transmission period 2904. The data transmission periods 2902 and 2903 are expanded.

In the above-mentioned embodiments, it is also possible to provide methods of communication between the base station and the mobile unit communication apparatus by combining the first embodiment with any of the second to eighth embodiments, combining the second embodiment with any of the third to eight embodiments, combining the eighth embodiment with any of other embodiments.

What is claimed is:

1. A method of communication between a base station and at least a mobile unit communication apparatus through the code division multiple accessing, comprising the steps of:

in said base station, (a) providing a plurality of antennas to said base station for the antenna diversity communication;

(b) spectrum-spreading data to be transmitted to said mobile unit communication apparatus with a first pseudonoise code assigned to said mobile unit communication apparatus;

(c) spectrum-spreading a pilot signal with second pseudonoise codes respectively assigned to a plurality of said antennas to generate spectrum-spread pilot signals, said first pseudonoise code being different from each of said second pseudonoise codes;

(d) multiplexing one of said spectrum-spread pilot signals corresponding to one of a plurality of said antennas to be used with said spectrum-spread data; and (e) transmitting said multiplexed spectrum-spread pilot signal and spectrum-spread data as a radio wave signal through said one of a plurality of said antennas every downward time slot;

in said mobile unit communication apparatus, (f) receiving said radio wave signal;

(g) supplying one of third pseudonoise codes corresponding to said second pseudonoise codes;

(h) de-spectrum-spreading said received radio wave signals with said one of third pseudonoise codes to output a pilot signal correlation result;

(i) de-spectrum-spreading said received radio wave signals with a fourth pseudonoise code corresponding to said first pseudonoise code to provide data correlation results;

(j) RAKE-combining said data correlation results in accordance with said pilot signal correlation result to output a RAKE-combined signal;

(k) synchronously-detecting said RAKE-combined signal to output a combined signal; and (l) controlling supplying said one of said third pseudonoise codes in accordance with said combined signal.

2. A base station for communicating with at least a mobile unit communication apparatus through the code division multiple access comprising:

first spectrum-spreading means for spectrum-spreading data to be transmitted to said mobile unit communication apparatus with a first pseudonoise code assigned to said mobile unit communication apparatus;

selection means; and a plurality of transmission units respectively having a plurality of antennas provided for the antenna diversity communication, said selection means selecting one of a plurality of said antennas in accordance with control data, each of a plurality of said transmission units further including:

second spectrum-spreading means for spectrum-spreading a pilot signal with a second pseudonoise code assigned to the selected one of a plurality of said antennas to generate a spectrum-spread pilot signal, said first pseudonoise code being different from said second pseudonoise code, said selection means supplying the spectrum-spread data to one of said plurality transmission units in response to said control data to select said one of a plurality of said antennas;

multiplexing means for multiplexing said spectrum-spread pilot signal with said spectrum-spread data, and transmitting means for transmitting the multiplexed spectrum-spread pilot signal and the spectrum-spread data as a radio wave signal through the selected one of antennas every downward time slot.

3. A mobile unit communication apparatus for communicating with a base station having a plurality of antennas through the code division multiple accessing, said base station transmitting a radio wave signal by one of a plurality of said antennas, said radio wave signal including data multiplexed with a pilot signal, said data being spectrum-spread with a first pseudonoise code assigned to said mobile unit communication apparatus, said pilot signal being spectrum-spread with a second pseudonoise code assigned to said one of a plurality of said antennas transmitting said radio wave signal, said mobile unit communication apparatus comprising:

receiving means for receiving said radio wave signal;

switch means for supplying one of third pseudonoise codes corresponding to said second pseudonoise code;

first de-spectrum-spreading means for de-spectrum-spreading said received radio wave signal with said one of said third pseudonoise codes from said switch means to output a pilot signal correlation result;

second de-spectrum-spreading means for de-spectrum-spreading said received radio wave signal with a fourth pseudonoise code corresponding to said second pseudonoise code to provide data correlation results;

RAKE-combining means for RAKE-combining said data correlation results in accordance with said pilot signal correlation result to output a RAKE-combined signal;

synchronously-detecting means for synchronously-detecting said RAKE-combined signal; and controlling means for controlling said switch means to supply said one of said third pseudonoise codes in accordance with an output of said synchronously-detecting means.

4. The method as claimed in claim 1, wherein said pilot signal is spectrum-spread with said first pseudonoise codes only for a predetermined symbol period in said downward time slot.

5. The method as claimed in claim 4, wherein said data is spectrum-spread for a predetermined interval other than said predetermined symbol period in said downward time slot.

6. A base station for communicating with at least a mobile unit communication apparatus through the code division multiple access comprising:

first spectrum-spreading means for spectrum-spreading data to be transmitted to said mobile unit communication apparatus with a first pseudonoise code assigned to said mobile unit communication apparatus;

selection means; and a plurality of transmission units respectively having a plurality of antennas provided for the antenna diversity communication, said selection means selecting one of said antennas in accordance with control data, each of a plurality of said transmission units further including:

first and second switching means;

second spectrum-spreading means for spectrum-spreading a pilot signal with a second pseudonoise code assigned to the selected one of a plurality of said antennas to generate a spectrum-spread pilot signal, said first pseudonoise code being different from said second pseudonoise code, said selection means supplying the spectrum-spread data to one of a plurality of said transmission units in response to said control data to select said one of a plurality of said antennas;

multiplexing means for multiplexing the spectrum-spread pilot signal with the spectrum-spread data, said first switching means supplying said spectrum-spread pilot signal to said multiplexing means for a predetermined symbol period in a downward time slot, said second switching means supplying said spectrum-spread data to said multiplexing means for a period other than said predetermined interval in said downward time slot; and transmitting means for transmitting the multiplexed spectrum-spread pilot signal and the spectrum-spread data as a radio wave signal through said antenna every said downward time slot.

7. A mobile unit communication apparatus for communicating with a base station having a plurality of antennas through the code division multiple accessing, said base station transmitting a radio wave signal by one of a plurality of said antennas, said radio wave signal including data multiplexed with a pilot signal, said data being spectrum-spread with a first pseudonoise code assigned to said mobile unit communication apparatus for a predetermined interval in a downward time slot, said pilot signal being spectrum-spread with a second pseudonoise code assigned to said one of a plurality of said antennas transmitting said radio wave signal for a period other than said predetermined interval in said downward time slot, said mobile unit communication apparatus comprising:

receiving means for receiving said radio wave signal;

switch means for supplying one of third pseudonoise codes corresponding to said second pseudonoise code;

first de-spectrum-spreading means for de-spectrum-spreading said received radio wave signal with said one of said third pseudonoise codes from said switch means to output a pilot signal correlation result;

second de-spectrum-spreading means for de-spectrum-spreading said received radio wave signal with a fourth pseudonoise code corresponding to said first pseudonoise code to provide data correlation results;

storing means for storing said data correlation results;

RAKE-combining means for RAKE-combining said data correlation results from said storing means in accordance with said pilot signal correlation result to output a RAKE-combined signal;

synchronously-detecting means for synchronously-detecting said RAKE-combined signal; and controlling means for controlling said switch means to supply said one of said third pseudonoise codes in accordance with an output of said synchronously-detecting means.

8. The method as claimed in claim 1, further comprising the steps of:

in said mobile unit communication apparatus, determining which one of a plurality of said antennas is used in accordance with said received radio wave signals;

generating a command indicative of which one of a plurality of said antennas is used; and transmitting said command to said base station;

in said base station, receiving the transmitted command, wherein said one of third pseudonoise codes corresponding to said second pseudonoise codes being supplied in accordance with the transmitted command.

9. The method as claimed in claim 1, further comprising the steps of:

in said base station, determining one of a plurality of said antennas to be used;

providing a null data interval in a data interval of said spectrum-spread data in said time slot at one of predetermined positions in said downward time slot in accordance with said determined one of a plurality of said antennas; and in said mobile unit communication apparatus, detecting said null data interval and detecting said one of predetermined positions from said radio wave signal, said one of third pseudonoise codes corresponding to said second pseudonoise codes being supplied in accordance with the detected one of predetermined positions.

10. The method as claimed in claim 1, further comprising the steps of:

in said base station, determining one of a plurality of said antennas to be used;

differentially-coding information indicative of said one of plurality of said antennas to be used;

providing the differentially-coded information in said downward time slot together with said spectrum-spread data;

in said mobile unit communication apparatus, detecting said differentially-coded information from the received radio wave signal through the delayed-detection; and said one of third pseudonoise codes corresponding to said second pseudonoise codes being supplied in accordance with the detected differentially-coded information.

11. A base station for communicating with at least a mobile unit communication apparatus through the code division multiple access comprising:

first spectrum-spreading means for spectrum-spreading data to be transmitted to said mobile unit communication apparatus with a first pseudonoise code assigned to said mobile unit communication apparatus;

selection means; and a plurality of transmission units respectively having a plurality of antennas provided for the antenna diversity communication, said selection means selecting one of said antennas in accordance with control data, each of a plurality of said transmission units further including:

second spectrum-spreading means for spectrum-spreading a pilot signal with a second pseudonoise code assigned to the selected antenna to generate a spectrum-spread pilot signal, said first pseudonoise code being different from said second pseudonoise code, said selection means supplying the spectrum-spread data to one of a plurality of said transmission units in accordance with said control data to select said one of a plurality of said antennas;

multiplexing means for multiplexing said spectrum-spread pilot signal with said spectrum-spread data, and transmitting means for transmitting the multiplexed spectrum-spread pilot signal and the spectrum-spread data as a radio wave signal through the selected antenna;

differentially-coding means for differentially-coding said control data; and time division multiplex means for time-division-multiplexing the differentially-coded control data with said data in a downward time slot, said first spectrum-spreading means spectrum-spreading the differentially-coded control data and said data.

12. A mobile unit communication apparatus for communicating with a base station having a plurality of antennas through the code division multiple accessing, said base station transmitting radio wave signal by one of a plurality of said antennas, said radio wave signal including differentially-coded control data indicative of one of a plurality of said antennas used and data multiplexed with a pilot signal, said data being spectrum-spread with a first pseudonoise code assigned to said mobile unit communication apparatus, said pilot signal being spectrum-spread with a second pseudonoise code assigned to one of a plurality of said antennas transmitting said radio wave signal, said mobile unit communication apparatus comprising:

receiving means for receiving said radio wave signal;

switch means for supplying one of third pseudonoise codes corresponding to said second pseudonoise code;

first de-spectrum-spreading means for de-spectrum-spreading said received radio wave signal with said one of said third pseudonoise codes from said switch means to output a pilot signal correlation result;

second de-spectrum-spreading means for de-spectrum-spreading said received radio wave signal with a fourth pseudonoise code corresponding to said first pseudonoise code to provide data correlation results;

RAKE-combining means for RAKE-combining said data correlation results in accordance with said pilot signal correlation result to output a RAKE-combined signal:

synchronously-detecting means for synchronously-detecting said RAKE-combined signal; and delayed-detection means for detecting said control data from said RAKE-combined signal through the delayed-detection; and controlling means for controlling said switch means to supply said one of said third pseudonoise codes in accordance with an output of said delayed-detection means.

13. The method as claimed in claim 1, further comprising the steps of:

(m) in said base station, error-check-coding said data to include error check codes before spectrum-spreading said data;

in said mobile unit communication apparatus, (n) error-correcting said data with said error check codes after synchronously-detecting said RAKE-combined signal;

(o) judging whether said data is error-corrected to a predetermined extent;

(p) outputting said error-corrected data if;

(q) supplying another of said third pseudonoise codes and effecting steps (h) to (k) and (n) to (p) until said data is error-corrected to said predetermined extent.

14. A base station for communicating with at least a mobile unit communication apparatus through the code division multiple access comprising:

error-check-coding means for error-check-coding data to be transmitted to said mobile unit communication apparatus;

first spectrum-spreading means for spectrum-spreading data from said error-check-coding means with a first pseudonoise code assigned to said mobile unit communication apparatus;

selection means; and a plurality of transmission units respectively having a plurality of antennas provided for the antenna diversity communication, said selection means selecting one of a plurality of said antennas in accordance with control data, each of a plurality of said transmission units further including:

second spectrum-spreading means for spectrum-spreading a pilot signal with a second pseudonoise code assigned to the selected antenna to generate a spectrum-spread pilot signal, said first pseudonoise code being different from said second pseudonoise code, said selection means supplying the spectrum-spread data to one of a plurality of said transmission units to select said one of a plurality of said antennas;

multiplexing means for multiplexing said spectrum-spread pilot signal with said spectrum-spread data; and transmitting means for transmitting the multiplexed spectrum-spread pilot signal and the spectrum-spread data as a radio wave signal through the selected antenna.

15. A mobile unit communication apparatus for communicating with a base station having a plurality of antennas through the code division multiple accessing, said base station transmitting a radio wave signal by one of a plurality of said antennas, said radio wave signal including data multiplexed with a pilot signal, said data error-check-coded to have error check codes, said data being spectrum-spread with a first pseudonoise code assigned to said mobile unit communication apparatus, said pilot signal being spectrum-spread with a second pseudonoise code assigned to said one of a plurality of said antennas transmitting said radio wave signal, said mobile unit communication apparatus comprising:

receiving means for receiving said radio wave signal;

switch means for supplying one of third pseudonoise codes corresponding to said second pseudonoise code;

first de-spectrum-spreading means for de-spectrum-spreading said received radio wave signal with said one of said third pseudonoise codes from said switch means to output a pilot signal correlation result;

second de-spectrum-spreading means for de-spectrum-spreading said received radio wave signal with a fourth pseudonoise code corresponding to said first pseudonoise code to provide data correlation results;

RAKE-combining means for RAKE-combining said data correlation results in accordance with said pilot signal correlation result to output a RAKE-combined signal;

synchronously-detecting means for synchronously-detecting said RAKE-combined signal;

error-correcting means for error correcting an output of said synchronously-detecting means; and controlling means for Judging whether said data from an output of said synchronously-detecting means is error-corrected to a predetermined extent, for outputting said error-corrected data if said data from said output of said synchronously-detecting means is error-corrected to said predetermined extent, for controlling said switching means to supply another of said third pseudonoise codes, and for operating said RAKE-combining means, said synchronously-detecting means, and said error-correcting means until said output of said synchronously-detecting means is error-corrected to said predetermined extent.

16. A method of communication between a base station and at least a mobile unit communication apparatus through the code division multiple accessing, comprising the steps of:

in said base station, (a) providing a plurality of antennas to said base station for the antenna diversity communication;

(b) error-correction-coding data to include error correction codes;

(c) spectrum-spreading data from step (b) with a first pseudonoise code assigned to said mobile unit communication apparatus;

(d) spectrum-spreading a pilot signal with second pseudonoise codes respectively assigned to a plurality of said antennas to generate spectrum-spread pilot signals, said first pseudonoise code being different from each of said second pseudonoise codes;

(e) multiplexing one of said spectrum-spread pilot signals corresponding to one of a plurality of said antennas to be used with said spectrum-spread data; and (f) transmitting said multiplexed spectrum-spread pilot signal and spectrum-spread data as a radio wave signal through said one of a plurality of said antennas to be used every downward time slot;

in said mobile unit communication apparatus, (g) receiving said radio wave signal;

(h) de-spectrum-spreading said received radio wave signal with third pseudonoise codes corresponding to said second pseudonoise codes to output pilot signal correlation results in parallel;

(i) de-spectrum-spreading said received radio wave signals with a fourth pseudonoise code corresponding to said first pseudonoise code to provide data correlation results;

(j) RAKE-combining said data correlation results in accordance with said pilot signal correlation results to output RAKE-combined signals in parallel;

(k) synchronously-detecting said RAKE-combined signals to output detection signals in parallel;

(l) error-correcting said data from said detection signals with said error check codes, outputting error-corrected signals, and generating syndromes in said detection signals;

(m) predicting said one of plurality of antennas used from said syndromes; and (n) outputting one of said error-corrected signals in accordance with the predicted one of plurality of antennas.

17. A base station for communicating with at least a mobile unit communication apparatus through the code division multiple access comprising:

error-correction-coding means for error-correction-coding data to be transmitted to said mobile unit communication apparatus;

first spectrum-spreading means for spectrum-spreading data error-correction-coding means with a first pseudonoise code assigned to said mobile unit communication apparatus;

selection means; and a plurality of transmission units respectively having a plurality of antennas provided for the antenna diversity communication, said selection means selecting one of a plurality of said antennas in accordance with control data, each of a plurality of said transmission units further including:

second spectrum-spreading means for spectrum-spreading a pilot signal with a second pseudonoise code assigned to the selected antenna to generate a spectrum-spread pilot signal, said first pseudonoise code being different from said second pseudonoise code, said selection means supplying the spectrum-spread data to one of a plurality of said transmission units to select said one of a plurality of said antennas;

multiplexing means for multiplexing said spectrum-spread pilot signal with said spectrum-spread data, and transmitting means for transmitting the multiplexed spectrum-spread pilot signal and the spectrum-spread data as a radio wave signal through said antenna.

18. A mobile unit communication apparatus for communicating with a base station having N antennas through the code division multiple accessing, said base station transmitting radio wave signal by one of said N antennas, said N being a natural number, said radio wave signal including data multiplexed with a pilot signal, said data being error-correction-coded to have error check codes, said data being spectrum-spread with a first pseudonoise code assigned to said mobile unit communication apparatus, said pilot signal being spectrum-spread with one of N second pseudonoise codes assigned to the antenna transmitting said radio wave signal, said mobile unit communication apparatus comprising:

receiving means for receiving said radio wave signal;

N first de-spectrum-spreading means for de-spectrum-spreading said received radio wave signal with N third pseudonoise codes respectively corresponding to said N second pseudonoise codes to output N pilot signal correlation results;

second de-spectrum-spreading means for de-spectrum-spreading said received radio wave signal with a fourth pseudonoise code corresponding to said first pseudonoise code to provide data correlation results;

N RAKE-combining means for respectively RAKE-combining said data correlation results in accordance with said N pilot signal correlation results to output N RAKE-combined signals;

N synchronously-detecting means for respectively synchronously-detecting said N RAKE-combined signals to output N detection signals;

N error-correcting means for error-correcting N detection signals to output N error-corrected signals and generating corresponding N syndromes; and control means for predicting which one of said N antennas is used from said N syndromes, and for outputting one of said N error-corrected signals corresponding to said N syndrome showing a highest probability.

19. A method of communication between a base station and at least a mobile unit communication apparatus through the code division multiple accessing and the time-division-duplexing, comprising the steps of:

in said base station, (a) providing a plurality of antennas to said base station for the antenna diversity communication;

(b) spectrum-spreading data to be transmitted to said mobile unit communication apparatus with a first pseudonoise code assigned to said mobile unit communication apparatus every downward time slot;

(c) spectrum-spreading a pilot signal with second pseudonoise codes respectively assigned to a plurality of said antennas to generate spectrum-spread pilot signals every downward time slot, said first pseudonoise codes being different from each of said second pseudonoise codes;

(d) multiplexing one of said spectrum-spread pilot signals corresponding to one of a plurality of said antennas to be used with said spectrum-spread data; and (e) transmitting said multiplexed spectrum-spread pilot signal and spectrum-spread data as a radio wave signal through said one of a plurality of said antennas every said downward time slot;

in said mobile unit communication apparatus, (f) receiving said radio wave signal to output said data in accordance with the pilot signal included in said radio wave signal;

(f) spectrum-spreading second data to be transmitted to said base station with a third pseudonoise code corresponding to said first pseudonoise code;

(g) spectrum-spreading a second pilot signal with said third pseudonoise code;

(h) time-division-multiplexing said spectrum-spread second pilot signal with the spectrum-spread second data in every upward time slot; and (i) transmitting the time-division-multiplexed spectrum-spread second pilot signal and the spectrum-spread second data as a second radio wave signal.

20. A base station for communicating with at least a mobile unit communication apparatus through the code division multiple access and the time-division-duplexing comprising:

first spectrum-spreading means for spectrum-spreading data to be transmitted to said mobile unit communication apparatus with a first pseudonoise code assigned to said mobile unit communication apparatus;

selection means; and a plurality of transmission units respectively having a plurality of antennas provided for the antenna diversity communication, said selection means selecting one of a plurality of said antennas in accordance with control data to select said one of a plurality of said antennas, each of a plurality of said transmission units further including:

second spectrum-spreading means for spectrum-spreading a pilot signal with a second pseudonoise code assigned to the selected antenna to generate a spectrum-spread pilot signal, said first pseudonoise code being different from said second pseudonoise code,;

multiplexing means for multiplexing said spectrum-spread pilot signal with said spectrum-spread data; and transmitting means for transmitting the multiplexed spectrum-spread pilot signal and the spectrum-spread data as a radio wave signal through said antenna every downward time slot; and receiving means for receiving a second radio wave signal from said mobile unit communication apparatus every upward time slot.

21. A mobile unit communication apparatus for communicating with a base station having a plurality of antennas through the code division multiple accessing and the time-division-duplexing, said base station transmitting first radio wave signal by one of a plurality of antennas, said first radio wave signal including first data multiplexed with a first pilot signal, said first radio wave signal said data being spectrum-spread with a first pseudonoise code assigned to said mobile unit communication apparatus, said first pilot signal being spectrum-spread with a second pseudonoise code assigned to said one of a plurality of said antennas transmitting said first radio wave signal, said mobile unit communication apparatus comprising:

receiving means for receiving said first radio wave signal;

switch means for supplying one of third pseudonoise codes corresponding to said second pseudonoise codes;

first de-spectrum-spreading means for de-spectrum-spreading said received first radio wave signal with said one of said third pseudonoise codes from said switch means to output a pilot signal correlation result;

second de-spectrum-spreading means for de-spectrum-spreading said received radio wave signal with a fourth pseudonoise code corresponding to said first pseudonoise code to provide data correlation results;

RAKE-combining means for RAKE-combining said data correlation results in accordance with said pilot signal correlation result to output a RAKE-combined signal;

synchronously-detecting means for synchronously-detecting said RAKE-combined signal;

controlling means for controlling said switch means to supply said one of said third pseudonoise codes in accordance with an output of said synchronously-detecting means;

third spectrum-spreading means for spectrum-spreading second data to be transmitted to said base station with said fourth pseudonoise code;

fourth spectrum-spreading means for spectrum-spreading a second pilot signal with said third pseudonoise code;

time-division-duplexing means for time-division-duplexing said spectrum-spread pilot signal from said fourth spectrum-spreading means with said spectrum-spread second data; and transmitting means for transmitting an output of the time-division-duplexing means as a second radio wave signal every downward time slot to said base station.

* * * * *